US012247184B2

(12) United States Patent
Shearouse et al.

(10) Patent No.: US 12,247,184 B2
(45) Date of Patent: *Mar. 11, 2025

(54) LIQUID DETERGENT COMPOSITION

(71) Applicant: The Procter & Gamble Company, Cincinnati, OH (US)

(72) Inventors: William Coffin Shearouse, Cincinnati, OH (US); Kevin Bernard Kluesener, Franklin, OH (US); Samuel John Moskal, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,838

(22) Filed: Oct. 27, 2023

(65) Prior Publication Data

US 2024/0067900 A1 Feb. 29, 2024

Related U.S. Application Data

(63) Continuation of application No. 17/974,063, filed on Oct. 26, 2022, now Pat. No. 11,834,626, which is a continuation of application No. 16/923,398, filed on Jul. 8, 2020, now Pat. No. 11,512,264.

(51) Int. Cl.

| | |
|---|---|
| ***C11D 1/04*** | (2006.01) |
| ***C11D 1/72*** | (2006.01) |
| ***C11D 1/75*** | (2006.01) |
| ***C11D 1/86*** | (2006.01) |
| ***C11D 3/20*** | (2006.01) |
| ***C11D 3/40*** | (2006.01) |
| ***C11D 3/50*** | (2006.01) |
| ***C11D 17/00*** | (2006.01) |
| ***C11D 17/04*** | (2006.01) |

(52) U.S. Cl.

CPC .................. *C11D 1/72* (2013.01); *C11D 1/75* (2013.01); *C11D 1/86* (2013.01); *C11D 3/2075* (2013.01); *C11D 3/40* (2013.01); *C11D 3/505* (2013.01); *C11D 17/0008* (2013.01); *C11D 17/043* (2013.01); *C11D 2111/12* (2024.01)

(58) Field of Classification Search

None

See application file for complete search history.

(56) References Cited

U.S. PATENT DOCUMENTS

| | | | |
|---|---|---|---|
| 5,851,976 A | 12/1998 | Mertens | |
| 6,020,296 A | 2/2000 | Mertens et al. | |
| 6,083,893 A | 7/2000 | Zint et al. | |
| 7,754,669 B2 | 7/2010 | Bastigkeit et al. | |
| 7,994,111 B2 | 8/2011 | Caggioni et al. | |
| 8,992,632 B2 | 3/2015 | Holzhauer et al. | |
| 9,102,902 B2 | 8/2015 | Man et al. | |
| 9,127,238 B2 | 9/2015 | Man et al. | |
| 9,139,798 B2 | 9/2015 | Holzhauer | |
| 10,066,190 B2 | 9/2018 | Coope-epstein et al. | |
| 11,512,264 B2 | 11/2022 | Shearouse et al. | |
| 11,834,626 B1 | 12/2023 | Shearouse et al. | |
| 2011/0099725 A1 | 5/2011 | Dykstra et al. | |
| 2013/0296218 A1 | 11/2013 | Wang et al. | |
| 2014/0023609 A1 | 1/2014 | Mukherjee et al. | |
| 2016/0068784 A1* | 3/2016 | Vinson | C11D 3/38636 510/357 |
| 2017/0198237 A1 | 7/2017 | Shearouse et al. | |
| 2017/0216162 A1 | 8/2017 | Feng et al. | |
| 2017/0216163 A1 | 8/2017 | Feng et al. | |
| 2017/0253833 A1 | 9/2017 | Savaglio et al. | |
| 2017/0292086 A1 | 10/2017 | Seiler et al. | |
| 2018/0235893 A1 | 8/2018 | Zhang et al. | |
| 2019/0382689 A1 | 12/2019 | Murphy et al. | |

OTHER PUBLICATIONS

All Office Actions; U.S. Appl. No. 16/923,398, filed Jul. 8, 2020.
All Office Actions; U.S. Appl. No. 17/974,063, filed Oct. 26, 2022.

* cited by examiner

*Primary Examiner* — Lorna M Douyon
(74) *Attorney, Agent, or Firm* — Andrew J. Mueller

(57) ABSTRACT

A detergent composition having a) from about 10% to about 60%, by weight of the composition, of a surfactant system wherein the surfactant system includes: i) at least 35%, by weight of the surfactant system, of nonionic surfactant and ii) from 5% to about 20%, by weight of the surfactant system, of amine oxide.

10 Claims, No Drawings

LIQUID DETERGENT COMPOSITION

FIELD OF THE INVENTION

The present invention relates to the field of liquid laundry detergent compositions that do not contain alkyl ethoxy sulfate (AES) surfactants and/or silicone suds suppressors. The present invention also relates to methods of using such compositions in treating textiles.

BACKGROUND OF THE INVENTION

Presently, the North American domestic laundry washing machine market (as well as to some extent, that of the global laundry market) is divided into three main types of washing machine: (1) historical "top-loading" or "vertical "axis" configuration, (2) "front-loading", "high efficiency" ("HE") or "horizontal axis" washing machines, and (3) "top-loading" HE washing machines. HE washing machines utilize stricter energy and water consumption regulations which have led to HE washing machines as being an increased portion of new machines sold. Additionally, consumers preferences have shifted towards simpler formulations having fewer components either due to regulations or due to general preferences. Many of the deemed undesirable components are considered synthetic and, as a non-limiting example regarding silicones, have been used for suppressing suds. While it may seem strange, consumers have come to associate suds with cleaning and therefore laundry detergent manufacturers must ensure that the right amount of suds during the wash cycle is observed to meet consumers' expectations. If the incorrect level of suds is created, the consumer may altogether stop using a detergent, even if it provides the appropriate level of cleaning.

HE washing machines, both top-loading HE machines and front-loading HE machines, typically cannot have high sudsing during the wash cycle due to engineering constraints. Manufacturers of such machines have put suds detectors in place to ensure that the machines do not leak during the wash cycle. Machines will typically shut off ("suds lock"), at least temporarily, during high levels of suds creation to allow the suds to dissipate. Therefore, under most circumstances, if a top-loading detergent is used in a front-loading machine, the machine will either operate very slowly (stopping several times during the cycle to allow suds to subside) or will shut down altogether. Either result is extremely frustrating to the consumer. Traditionally, this issue has been resolved in formulation by the addition of silicone suds suppressors. However, as stated above, there is a consumer preference to shift to simpler formulations, thereby asking more from less.

As such, there is a need to create a formulation that provides the desirable level of sudsing and cleaning performance while reducing the number of components in the formulation as a whole.

SUMMARY OF THE INVENTION

It has now surprisingly been found that a single formulation can provide acceptable cleaning and suds regulation while reducing undesirable components from the formulation, such as, silicone suds suppressors.

Disclosed is a detergent composition. The detergent composition comprises a) from about 1% to about 60%, by weight of the composition, of a surfactant system wherein said surfactant system comprises: i) at least 35%, by weight of the surfactant system, of non-ionic surfactant and ii) from 5% to about 20%, by weight of the surfactant system, of amine oxide. The detergent composition further comprises greater than 3% of fatty acid.

Further disclosed is a detergent composition. The detergent composition comprises a) from about 1% to about 60%, by weight of the composition, of a surfactant system wherein said surfactant system comprises: i) at least 35%, by weight of the surfactant system, of nonionic surfactant and ii) from 5% to about 20%, by weight of the surfactant system, of amine oxide. The detergent composition further comprises fatty acid. The detergent composition comprises a fatty acid to amine oxide ratio of greater than about 2.

DETAILED DESCRIPTION OF THE INVENTION

As used herein, "laundry detergent composition" includes any composition comprising a fluid capable of wetting and cleaning fabric (e.g. clothing), in a domestic washing machine. The composition can include solids or gases in suitably subdivided form, but the overall composition excludes product forms which are nonfluid overall, such as tablets or granules. The compact fluid detergent compositions preferably have densities in the range from 0.9 to 1.3 grams per cubic centimeter, more specifically from 1.00 to 1.10 grams per cubic centimeter, excluding any solid additives but including any bubbles, if present.

All percentages, ratios and proportions used herein are by weight percent of the composition, unless otherwise specified. All average values are calculated "by weight" of the composition or components thereof, unless otherwise expressly indicated.

Aqueous Liquid Detergent Compositions

The aqueous liquid detergent compositions herein are preferably laundry detergent compositions and are more preferably dual-usage aqueous liquid laundry detergent compositions, meaning for use in HE domestic washing machines found traditionally in North American households. While the advantage of these compositions of combined cleaning and appropriate sudsing levels is best seen in this market, such compositions may of course be used in other laundry and general detergency fields.

The composition includes liquid and/or gel form laundry detergents, including packaged forms thereof, comprising a flowable laundry composition contained in a package, wherein (i) the flowable laundry composition has a viscosity of at least at least 100 Pascal-seconds. preferably at least 500 Pascal-seconds, when in rest or up to a shear stress of 10 Pascal.

The composition also includes shear thinning gel-type compositions. The viscosity under shear stress of such compositions may be less than 300 Pascal-seconds, preferably less than 100 Pascal-seconds and more preferably less than 5 Pascal-seconds, even more preferably it is at most 1 Pascal-second and most preferably it is at most 0.5 Pascal-seconds.

Water

The detergent compositions herein may be concentrated aqueous liquid or gel-form laundry detergent compositions. The water content of the detergent compositions of the present invention is at least 1%, alternatively from about 1% to about 45%, alternatively from about 10% to about 40% by weight of the composition, of water. In one embodiment, the composition comprises from about 35% to about 99% water, and alternatively from about 40% to about 90% water, by weight of the composition.

Surfactant

The detergent compositions may comprise one or more surfactants. In particular, the detergent compositions may contain 2-alkyl primary alkyl alcohol sulfates, 2-alkyl branched alcohols (and the 2-alkyl branched alkyl sulfates are positional isomers, where the location of the hydroxymethyl group) consisting of a methylene bridge ($-CH_2-$ unit) connected to a hydroxy ($-OH$) group) on the carbon chain varies. Thus, a 2-alkyl branched alkyl alcohol is generally composed of a mixture of positional isomers. Furthermore, it is well known that fatty alcohols, such as 2-alkyl branched alcohols, and surfactants are characterized by chain length distributions. In other words, fatty alcohols and surfactants are generally made up of a blend of molecules having different alkyl chain lengths (though it is possible to obtain single chain-length cuts). Notably, the 2-alkyl primary alcohols described herein, which may have specific alkyl chain length distributions and/or specific fractions of certain positional isomers, cannot be obtained by simply blending commercially available materials. Specifically, the distribution of from about 50% to about 100% by weight surfactants having m+n=11 is not achievable by blending commercially available materials.

The detergent composition comprising from about 0.1% to about 99% by weight of the composition of a first surfactant, wherein said first surfactant consists essentially of a mixture of surfactant isomers of Formula I and surfactants of Formula II:

(I)

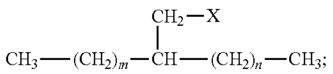

$6 \leq m \leq 11$ (II)

$CH_3-(CH_2)_{m+n+3}-X;$ $0 \leq m \leq 5$ wherein from about 50% to about 100% by weight of the first surfactant are isomers having m+n=11; wherein from about 25% to about 50% of the mixture of surfactant isomers of Formula I have n=0; wherein from about 0.001% to about 25% by weight of the first surfactant are surfactants of Formula II; and wherein X is a hydrophilic moiety.

X may be selected from sulfates, alkoxylated alkyl sulfates, sulfonates, amine oxides, polyalkoxylates, polyhydroxy moieties, phosphate esters, glycerol sulfonates, polygluconates, polyphosphate esters, phosphonates, sulfosuccinates, sulfosuccaminates, polyalkoxylated carboxylates, glucamides, taurinates, sarcosinates, glycinates, isethionates, dialkanolamides, monoalkanolamides, monoalkanolamide sulfates, diglycolamides, diglycolamide sulfates, glycerol esters, glycerol ester sulfates, glycerol ethers, glycerol ether sulfates, polyglycerol ethers, polyglycerol ether sulfates, sorbitan esters, polyalkoxylated sorbitan esters, ammonio-alkanesulfonates, amidopropyl betaines, alkylated quats, alkylated/polyhydroxyl alkylated quats, alkylated/polyhydroxylated oxypropyl quats, imidazolines, 2-yl-succinates, sulfonated alkyl esters, sulfonated fatty acids, and mixtures thereof.

The first surfactant may have between about 15% to about 40% of the mixture of surfactant isomers of Formula I have n=1, such as, for example between about 20% to about 40%, between about 25% to about 35%, or between about 30% to about 40%. The first surfactant may have between about 60% to about 90% of the mixture of surfactant isomers of Formula I have n<3, such as, for example between about 65% and 85%, between about 70% and 90%, or between about 80% and 90%. The detergent composition may have between about 90% to about 100% of the first surfactant where the isomers have m+n=11, such as, for example between about 95% and 100%.

The first surfactant may have from about 15% to about 40% by weight of the first surfactant mixture are isomers of Formula I with n=1 and from about 5% to about 20% by weight of the first surfactant mixture are isomers of Formula I with n=2. The first surfactant may have no isomers of Formula I with n equal to or greater than 6. The first surfactant may have up to about 40% of the mixture of surfactant isomers of Formula I with n>2. The first surfactant may have up to about 25% of the mixture of surfactant isomers of Formula I have n>2. The first surfactant may have up to about 20% by weight of the Formula II isomer.

The detergent composition may further comprise further an adjunct cleaning additive. The adjunct cleaning additive may be a builder, an organic polymeric compound, an enzyme, an enzyme stabilizer, one or more solvents a bleach system, a brightener, a hueing agent, a chelating agent, a suds suppressor, a conditioning agent, a humectant, a perfume, a filler or carrier, an alkalinity system, a pH control system, and a buffer, and mixtures thereof.

The detergent composition may further comprise from about 0.1% to about 99% by weight of the composition of a second surfactant, wherein said second surfactant consists essentially of a mixture of surfactant isomers of Formula III and surfactants of Formula IV:

(III)

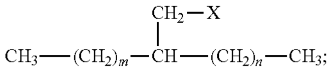

$6 \leq m \leq 9$ (IV)

$CH_3-(CH_2)_{m+n+3}-X;$ $0 \leq m \leq 5$ wherein from about 50% to about 100% by weight of the first surfactant are isomers having m+n=9; wherein from about 0.001% to about 25% by weight of the first surfactant are surfactants of Formula IV; and wherein X is a hydrophilic moiety. X may be selected from alkyl sulfates, alkoxylated alkyl sulfates, sulfonates, amine oxides, polyalkoxylates, polyhydroxy moieties, phosphate esters, glycerol sulfonates, polygluconates, polyphosphate esters, phosphonates, sulfosuccinates, sulfosuccaminates, polyalkoxylated carboxylates, glucamides, taurinates, sarcosinates, glycinates, isethionates, dialkanolamides, monoalkanolamides, monoalkanolamide sulfates, diglycolamides, diglycolamide sulfates, glycerol esters, glycerol ester sulfates, glycerol ethers, glycerol ether sulfates, polyglycerol ethers, polyglycerol ether sulfates, sorbitan esters, polyalkoxylated sorbitan esters, ammonio-alkanesulfonates, amidopropyl betaines, alkylated quats, alkylated/polyhydroxyl alkylated quats, alkylated/polyhydroxylated oxypropyl quats, imidazolines, 2-yl-succinates, sulfonated alkyl esters, sulfonated fatty acids, and mixtures thereof.

Between about 25% to about 50% of the mixture of second surfactant isomers of Formula III may have n=0, such as, for example between 30% and 45%, between 35% and 45%, or between 40% and 50%. Between about 15% to about 40% of the mixture of second surfactant isomers of Formula III may have n=1, such as, for example, between 20% and 40%, between 25% and 35%, or between 30% and 40%. Between about 50% to about 90% of the mixture of second surfactant isomers of Formula III may have n<3, such as, for example between 55% and 90%, between 60% and 80%, or between 70% and 90%. Between about 90% to about 100% of the second surfactant may comprise isomers having m+n=9, such as, for example between 95% and 100%.

The second surfactant may have from about 25% to about 50% by weight of the second surfactant mixture are isomers of Formula III with n=0, from about 15% to about 40% by weight of the second surfactant mixture are isomers of Formula III with n=1, and from about 5% to about 20% by weight of the second surfactant mixture are isomers of Formula III with n=2. Up to about 40% of the mixture of surfactant isomers of Formula III may have n>2. Up to about 35% of the mixture of surfactant isomers of Formula III may have n>2. The second surfactant mixture of surfactants may comprise up to about 20% by weight of the Formula IV isomer.

The detergent composition may comprise a surfactant system comprising between about 30 to about 99% of the first surfactant and between about 0.5% to about 40% of the second surfactant, preferably 0.5 to 20% of the second surfactant, more preferably 0.5 to 12.5% of the second surfactant. The detergent composition may comprise a surfactant system comprising between about 60% to about 99% of the first surfactant and up to about 25% of the second surfactant.

The detergent composition may comprise the second surfactant and the first surfactant at a ratio between 0.5:10 to 4:10, such as, for example, 1:10, 2:10, or 3:10.

The detergent composition may further comprise a third surfactant selected from the group consisting of an anionic surfactant, a cationic surfactant, a nonionic surfactant, an amphoteric surfactant, a zwitterionic surfactant, or mixtures thereof; or wherein said detergent composition comprises an anionic surfactant selected from alkyl benzene sulfonates, alkoxylated alkyl sulfates, alkyl sulfates, and mixtures thereof.

The detergent composition may be in a form selected from the group consisting of a liquid laundry detergent, a gel detergent, a single-phase or multi-phase unit dose detergent, a detergent contained in a single-phase or multi-phase or multi-compartment water soluble pouch, a liquid hand dishwashing composition, a laundry pretreat product, an automatic dish-washing detergent, a hard surface cleaner, a fabric softener composition, and mixtures thereof.

The detergent composition may be incorporated into a fibrous product. The detergent composition may be incorporated into the fibers of a fibrous product, particles within a fibrous product, or a combination thereof.

The detergent composition may have from about 0.1% to about 100% of the carbon content of one or more of the surfactants including, without limitation, the nonionic surfactant and the amine oxide or a combination thereof that is derived from renewable sources.

The detergent composition may be used in a method of pretreating or treating a soiled fabric comprising contacting the soiled fabric with the detergent composition.

The detergent compositions may comprise an additional surfactant (e.g., a third surfactant, a fourth surfactant) selected from the group consisting of anionic surfactants, nonionic surfactants, cationic surfactants, zwitterionic surfactants, amphoteric surfactants, ampholytic surfactants, and mixtures thereof. The additional surfactant may be a detersive surfactant, which those of ordinary skill in the art will understand to encompass any surfactant or mixture of surfactants that provide cleaning, stain removing, or laundering benefit to soiled material.

The detergent compositions may contain from about 0.01% to about 5% by weight of the detergent composition of an alcohol composition. The detergent compositions may contain from about 0.5% to about 3.0% by weight of the detergent composition of an alcohol composition. At such concentrations, the alcohol compositions may provide suds suppressing benefits to the detergent composition.

The detergent compositions may contain from about 0.01% to about 0.5% by weight of the detergent composition of an alcohol composition. At such concentrations, the alcohol compositions may be impurities.

Laundry Ingredients:

The detergent composition or laundry care composition may comprise other suitable adjuncts which, in some respects, can be wholly or partially incorporated. Adjuncts may be selected according to the laundry composition's intended function. The first composition may comprise an adjunct. In some respects, in the case of multi-compartment unit dose articles, the adjuncts may be part of a non-first (e.g., second, third, fourth, etc.) composition encapsulated in compartments separate from the first composition. The non-first composition may be any suitable composition. The non-first composition may be in the form of a liquid, a dispersion, a gel, a paste or a mixture thereof.

Surfactant

Suitable surfactants include anionic surfactants, non-ionic surfactant, cationic surfactants, zwitterionic surfactants and amphoteric surfactants and mixtures thereof. Suitable surfactants may be linear or branched, substituted or unsubstituted, and may be derived from petrochemical material or biomaterial. Preferred surfactant systems comprise both anionic and nonionic surfactant, preferably in weight ratios from 90:1 to 1:90. In some instances a weight ratio of anionic to nonionic surfactant of at least 1:1 is preferred. However, a ratio below 10:1 may be preferred. When present, the total surfactant level is preferably from 0.1% to 60%, from 1% to 50% or even from 5% to 40% by weight of the subject composition.

Anionic Surfactant

Anionic surfactants include, but are not limited to, those surface-active compounds that contain an organic hydrophobic group containing generally 8 to 22 carbon atoms or generally 8 to 18 carbon atoms in their molecular structure and at least one water-solubilizing group preferably selected from sulfonate, sulfate, and carboxylate so as to form a water-soluble compound. Usually, the hydrophobic group will comprise a C8-C22 alkyl, or acyl group. Such surfactants are employed in the form of water-soluble salts and the salt-forming cation usually is selected from sodium, potassium, ammonium, magnesium and mono-, with the sodium cation being the usual one chosen.

Anionic surfactants and adjunct anionic cosurfactants, may exist in an acid form, and said acid form may be neutralized to form a surfactant salt which is desirable for use in the present detergent compositions. Typical agents for neutralization include the metal counterion base such as hydroxides, e.g., NaOH or KOH. Further preferred agents for neutralizing anionic surfactants of the present invention and adjunct anionic surfactants or cosurfactants in their acid forms include ammonia, amines, oligoamines, or alkanolamines. Alkanolamines are preferred. Suitable non-limiting examples including monoethanolamine, diethanol amine, triethanol amine, and other linear or branched alkanolamines known in the art; for example, highly preferred alkanolamines include 2-amino-1-propanol, 1-aminopropanol, monoisopropanol amine, or 1-amino-3-propanol. Amine neutralization may be done to a full or partial extent, e.g. part of the anionic surfactant mix may be neutralized with sodium or potassium and part of the anionic surfactant mix may be neutralized with amines or alkanolamines.

Suitable sulfonate surfactants include methyl ester sulfonates, alpha olefin sulfonates, alkyl benzene sulfonates, especially alkyl benzene sulfonates, preferably C10-13 alkyl benzene sulfonate, more preferably C12 alkyl benzene sulfonate. Suitable alkyl benzene sulfonate (LAS) is obtainable, preferably obtained, by sulfonating commercially available linear alkyl benzene (LAB). Suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic surfactant is alkyl benzene sulfonate that is obtained by DETAL catalyzed process, DETAL-PLUS catalyzed process, although other synthesis routes, such as HF, and other alkylation catalysts such as zeolites ZSM-4, ZSM-12, ZSM-20, ZSM-35, ZSM-48, ZSM-50, MCM-22 TMA offretite, TEA mordenite, clinoptiloiite, mordenite, REY and zeolite Beta may also be suitable. In one aspect a magnesium salt of LAS is used. Preferably, the composition may contain from about 0.5% to about 30%, by weight of the laundry composition, of an HLAS surfactant selected from alkyl benzene sulfonic acids, alkali metal or amine salts of C10-16 alkyl benzene sulfonic acids, wherein the HLAS surfactant comprises greater than 50% C12, preferably greater than 60%, preferably greater than 70% C12, more preferably greater than 75%.

Suitable sulfate surfactants include alkyl sulfate, preferably C8-18 alkyl sulfate, or predominantly C12/14 alkyl sulfate.

The alkyl sulfate, and alkyl benzene sulfonates may be linear or branched, including 2-alkyl substituted or mid chain branched type, substituted or un-substituted, and may be derived from petrochemical material or biomaterial. Preferably, the branching group is an alkyl. Typically, the alkyl is selected from methyl, ethyl, propyl, butyl, pentyl, cyclic alkyl groups and mixtures thereof. Single or multiple alkyl branches could be present on the main hydrocarbyl chain of the starting alcohol(s) used to produce the sulfated anionic surfactant used in the detergent of the invention. Most preferably the branched sulfated anionic surfactant is selected from alkyl sulfates, and mixtures thereof.

Other suitable anionic surfactants include the class of glycolipids, such as sophorolipids and rhamnolipids and amino acid-based surfactants, e.g., acyl glycinates, acyl sarcosinates, acyl glutamates, and acyl taurates. The rhamnolipids may have a single rhamnose sugar ring or two rhamnose sugar rings.

Non-Ionic Surfactant:

Suitable non-ionic surfactants are selected from the group consisting of: C8-C18 alkyl ethoxylates, such as, NEODOL® non-ionic surfactants from Shell; alkyl polysaccharides, preferably alkylpolyglycosides and alkyl polypentosides; fatty acid methyl ester ethoxylates; polyhydroxy fatty acid amides; ether capped poly(oxyalkylated) alcohol surfactants; alkyl and alkenyl furan sulfonates and alkyl and alkenyl furan sulfates, and mixtures thereof.

Suitable non-ionic surfactants are alkyl polyglucosides and/or an alkyl alkoxylated alcohol.

Suitable non-ionic surfactants include alkyl alkoxylated alcohols, preferably $C_{8-18}$ alkyl alkoxylated alcohol, preferably a $C_{8-18}$ alkyl ethoxylated alcohol, preferably the alkyl alkoxylated alcohol has an average degree of alkoxylation of from 1 to 50, preferably from 1 to 30, or from 1 to 20, or from 1 to 10, preferably the alkyl alkoxylated alcohol is a $C_{8-18}$ alkyl ethoxylated alcohol having an average degree of ethoxylation of from 1 to 10, preferably from 1 to 7, more preferably from 1 to 5 and most preferably from 3 to 7. In one aspect, the alkyl alkoxylated alcohol is a $C_{12-15}$ alkyl ethoxylated alcohol having an average degree of ethoxylation of from 7 to 10. The alkyl alkoxylated alcohol can be linear or branched and substituted or un-substituted. Suitable nonionic surfactants include those with the trade name Lutensol® from BASF. The alkyl alkoxylated sulfate may have a broad alkoxy distribution for example Alfonic 1214-9 Ethoxylate or a peaked alkoxy distribution for example Novel 1214-9 both commercially available from Sasol.

Cationic Surfactant:

Suitable cationic surfactants include alkyl pyridinium compounds, alkyl quaternary ammonium compounds, alkyl quaternary phosphonium compounds, alkyl ternary sulfonium compounds, and mixtures thereof.

Preferred cationic surfactants are quaternary ammonium compounds having the general formula:

$$(R)(R_1)(R_2)(R_3)N^+X^-$$

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, preferred anions include: halides, preferably chloride; sulphate; and sulfonate.

The fabric care compositions of the present invention may contain up to about 30%, alternatively from about 0.01% to about 20%, more alternatively from about 0.1% to about 20%, by weight of the composition, of a cationic surfactant. For the purposes of the present invention, cationic surfactants include those which can deliver fabric care benefits. Non-limiting examples of useful cationic surfactants include: fatty amines, imidazoline quat materials and quaternary ammonium surfactants, preferably N,N-bis(stearoyl-oxy-ethyl) N,N-dimethyl ammonium chloride, N,N-bis(tallowoyl-oxy-ethyl) N,N-dimethyl ammonium chloride, N,N-bis(stearoyl-oxy-ethyl) N-(2hydroxyethyl) N-methyl ammonium methyl sulfate; 1,2 di(stearoyl-oxy) 3 trimethyl ammonium propane chloride dialkylene dimethyl ammonium salts such as dicanoladimethylammonium chloride, di(hard)tallow dimethyl ammonium chloride dicanoladimethylammonium methyl sulfate; 1-methyl-1-stearoylamidoethyl-2-stearoylimidazolinium methyl sulfate; 1-tallowylamidoethyl-2-tallowylimidazoline; N,N"-dialkyl diethylenetriamine; the reaction product of N-(2-hydroxyethyl)-1,2-ethylenediamine or N-(2-hydroxyisopropyl)-1,2-ethylenediamine with glycolic acid, esterified with fatty acid, where the fatty acid is (hydrogenated) tallow fatty acid, palm fatty acid, hydrogenated palm fatty acid, oleic acid, rapeseed fatty acid, hydrogenated rapeseed fatty acid; polyglycerol esters (PGEs), oily sugar derivatives, and wax emulsions and a mixture of the above.

It will be understood that combinations of softener actives disclosed above are suitable for use herein.

Amphoteric and Zwitterionic Surfactant

Suitable amphoteric or zwitterionic surfactants include amine oxides, and/or betaines. Preferred amine oxides are alkyl dimethyl amine oxide or alkyl amidopropyl dimethyl amine oxide, more preferably alkyl dimethyl amine oxide and especially coco dimethyl amino oxide. Amine oxide may have a linear or mid-branched alkyl moiety. Typical linear amine oxides include water-soluble amine oxides containing one R1 C8-18 alkyl moiety and 2 R2 and R3 moieties selected from the group consisting of C1-3 alkyl groups and C1-3 hydroxyalkyl groups. Preferably amine oxide is characterized by the formula R1—N(R2)(R3)O wherein R1 is a C8-18 alkyl and R2 and R3 are selected from the group consisting of methyl, ethyl, propyl, isopropyl, 2-hydroxethyl, 2-hydroxypropyl and 3-hydroxypropyl. The linear amine oxide surfactants in particular may include linear C10-C18 alkyl dimethyl amine oxides and linear C8-C12 alkoxy ethyl dihydroxy ethyl amine oxides.

It has been surprisingly found that one can reap the grease cleaning benefits of amine oxide while controlling the level of suds in the wash cycle without the use of silicone suds suppressors. As shown in Tables 1-5, it has been surprisingly found that by utilizing selective ratios of Fatty Acid (FA) to Amine Oxide (AO), one can create a cleaning composition that exhibits 'best in class' cleaning performance, cycle times, and water usage without the use of AES surfactants and silicone suds suppressors.

Other suitable surfactants include betaines, such as alkyl betaines, alkylamidobetaine, amidazoliniumbetaine, sulfobetaine (sultaines) as well as phosphobetaines.

Shading Dye

Fabric shading can be accomplished through application of any suitable ingredient as known in the art. Preferred fabric shading agents include fabric shading dyes, leuco dyes, pigments and mixtures thereof.

Fabric shading leading in some cases to whiteness improvements can be accomplished through application of leuco dyes via use of a single compound or a leuco composition comprising at least one leuco compound comprising any suitable leuco moiety. In one aspect, the leuco moiety is selected from the group consisting diarylmethane leuco moieties, triarylmethane leuco moieties, oxazine moieties, thiazine moieties, hydroquinone moieties, and arylaminophenol moieties. The leuco compound may comprise a leuco moiety and an alkyleneoxy moiety covalently bound to the leuco moiety, wherein the alkyleneoxy moiety comprises at least one ethylene oxide group, preferably the alkylene oxide moiety also comprises at least one propylene oxide group. Other suitable leuco dyes are disclosed in U.S. Pat. Nos. 10,377,976, 10,377,977, 10,351,709, 10,385,294, 10,472,595, 10,479,961, 10,501,633, 10,577,570, 10,590,275, 10,633,618, 10,647,854, and 10,676,699, incorporated in their entirety herein by reference.

The composition may comprise an additional fabric shading agent. Suitable fabric shading agents include dyes, dye-clay conjugates, and pigments. Suitable dyes include small molecule dyes and polymeric dyes. Suitable small molecule dyes include small molecule dyes selected from the group consisting of dyes falling into the Color Index (C.I.) classifications of Direct Blue, Direct Red, Direct Violet, Acid Blue, Acid Red, Acid Violet, Basic Blue, Basic Violet and Basic Red, or mixtures thereof. Preferred dyes include alkoxylated azothiophenes, Solvent Violet 13, Acid Violet 50 and Direct Violet 9.

Leuco Colorant Diluent

Another class of ingredients in the leuco colorants composition may be a diluent and/or solvent. The purpose of the diluent and/or solvent is often, but not limited to, improving fluidity and/or reducing the viscosity of the leuco colorant. Although water is often the preferred diluent and/or solvent given its low cost and non-toxicity, other solvent may also be used as well. The preferred solvent is one having low cost and low hazards. Examples of suitable solvents include, but are not limited to, ethylene glycol, propylene glycol, glycerin, alkoxylated polymers such as polyethylene glycol, polypropylene glycol, copolymers of ethylene oxide and propylene oxide, Tween 20®, Tween 40®, Tween 80®, and the like, and combinations thereof. Among the polymers, the ethylene oxide and propylene oxide copolymers may be preferred. These polymers often feature a cloud point with water, which can help the product separated from the water to remove the undesirable water-soluble impurities. Examples of ethylene oxide and propylene oxide copolymers include but not limited to the PLURONIC series polymers by BASF and TERGITOL™ series polymer and by Dow. When the leuco colorant composition is incorporated into the laundry care composition, these polymers may also act as a non-ionic surfactant.

The laundry care compositions described herein may also include one or more of the following non-limiting list of ingredients: fabric care benefit agent; detersive enzyme; deposition aid; rheology modifier; builder; chelant; bleach; bleaching agent; bleach precursor; bleach booster; bleach catalyst; perfume and/or perfume microcapsules; perfume loaded zeolite; starch encapsulated accord; polyglycerol esters; whitening agent; pearlescent agent; enzyme stabilizing systems; scavenging agents including fixing agents for anionic dyes, complexing agents for anionic surfactants, and mixtures thereof; optical brighteners or fluorescers; polymer including but not limited to soil release polymer and/or soil suspension polymer; dispersants; antifoam agents; non-aqueous solvent; fatty acid; cationic starches; scum dispersants; substantive dyes; colorants; opacifier; antioxidant; hydrotropes such as toluene sulfonates, cumene sulfonates and naphthalene sulfonates; color speckles; colored beads, spheres or extrudates; clay softening agents; anti-bacterial agents. Additionally, or alternatively, the compositions may comprise surfactants, quaternary ammonium compounds, and/or solvent systems. Quaternary ammonium compounds may be present in fabric enhancer compositions, such as fabric softeners, and comprise quaternary ammonium cations that are positively charged polyatomic ions of the structure $NR_4^+$, where R is an alkyl group or an aryl group.

Aesthetic Colorants

The composition may comprise one or more aesthetic colorants. Suitable aesthetic colorants include dyes, dye-clay conjugates, pigments, and Liquitint® polymeric colorants (Milliken & Company, Spartanburg, South Carolina, USA). In one aspect, suitable dyes and pigments include small molecule dyes and polymeric dyes. The aesthetic colorant may include at least one chromophore constituent selected from the group consisting of acridines, anthraquinones, azines, azos, benzofurans, benzodifuranones, carotenoids, coumarins, cyanines, diazahemicyanines, diphenylmethanes, formazans, hemicyanines, indigoids, methanes, methines, naphthalimides, naphthoquinones, nitros, nitrosos, oxazines, phenothiazine, phthalocyanines (such as copper phthalocyanines), pyrazoles, pyrazolones, quinolones, stilbenes, styryls, triarylmethanes (such as triphenylmethanes), xanthenes, and mixtures thereof.

In one aspect of the invention, aesthetic colorants include Liquitint® Blue AH, Liquitint® Blue BB, Liquitint® Blue 275, Liquitint® Blue 297, Liquitint® Blue BB, Cyan 15, Liquitint® Green 101, Liquitint® Orange 272, Liquitint® Orange 255, Liquitint® Pink AM, Liquitint® Pink AMC, Liquitint® Pink ST, Liquitint® Violet 129, Liquitint® Violet LS, Liquitint® Violet 291, Liquitint® Yellow FT, Liquitint® Blue Buf, Liquitint® Pink AM, Liquitint® Pink PV, Acid Blue 80, Acid Blue 182, Acid Red 33, Acid Red 52, Acid Violet 48, Acid Violet 126, Acid Blue 9, Acid Blue 1, and mixtures thereof.

Encapsulates.

The composition may comprise an encapsulated material. In one aspect, an encapsulate comprising a core, a shell having an inner and outer surface, said shell encapsulating said core. The core may comprise any laundry care adjunct, though typically the core may comprise material selected from the group consisting of perfumes; brighteners; hueing dyes; insect repellants; silicones; waxes; flavors; vitamins; fabric softening agents; skin care agents in one aspect, paraffins; enzymes; anti-bacterial agents; bleaches; sensates; and mixtures thereof; and said shell may comprise a material selected from the group consisting of polyethylenes; polyamides; polyvinyl alcohols, optionally containing other co-monomers; polystyrenes; polyisoprenes; polycarbonates; polyesters; polyacrylates; aminoplasts, in one aspect said aminoplasts may comprise a polyurea, polyurethane, and/or polyurea urethane, in one aspect said polyurea may comprise polyoxymethylene urea and/or melamine formaldehyde; polyolefins; polysaccharides, in one aspect said polysaccharide may comprise alginate and/or chitosan; gelatin; shellac; epoxy resins; vinyl polymers; water insoluble inorganics; silicone; and mixtures thereof.

Preferred encapsulates comprise perfume. Preferred encapsulates comprise a shell which may comprise melamine formaldehyde and/or crosslinked melamine formaldehyde. Other preferred capsules comprise a polyacrylate based shell. Preferred encapsulates comprise a core material and a shell, said shell at least partially surrounding said core material, is disclosed. At least 75%, 85% or even 90% of said encapsulates may have a fracture strength of from 0.2 MPa to 10 MPa, and a benefit agent leakage of from 0% to 20%, or even less than 10% or 5% based on total initial encapsulated benefit agent. Preferred are those in which at least 75%, 85% or even 90% of said encapsulates may have (i) a particle size of from 1 microns to 80 microns, 5 microns to 60 microns, from 10 microns to 50 microns, or even from 15 microns to 40 microns, and/or (ii) at least 75%, 85% or even 90% of said encapsulates may have a particle wall thickness of from 30 nm to 250 nm, from 80 nm to 180 nm, or even from 100 nm to 160 nm. Formaldehyde scavengers may be employed with encapsulates, for example, in a capsule slurry and/or added to a composition before, during or after the encapsulates are added to such composition. Suitable capsules that can be made by following the teaching of USPA 2008/0305982 A1; and/or USPA 2009/0247449 A1. Alternatively, suitable capsules can be purchased from Appleton Papers Inc. of Appleton, Wisconsin USA.

In a preferred aspect the composition may comprise a deposition aid, preferably in addition to encapsulates. Preferred deposition aids are selected from the group consisting of cationic and nonionic polymers. Suitable polymers include cationic starches, cationic hydroxyethyl cellulose, polyvinyl formaldehyde, locust bean gum, mannans, xyloglucans, tamarind gum, polyethylene terephthalate and polymers containing dimethyl aminoethyl methacrylate, optionally with one or more monomers selected from the group comprising acrylic acid and acrylamide.

Perfume.

Preferred compositions of the invention comprise perfume. Typically, the composition comprises a perfume that comprises one or more perfume raw materials, selected from the group as described in WO08/87497. However, any perfume useful in a laundry care composition may be used. A preferred method of incorporating perfume into the compositions of the invention is via an encapsulated perfume particle comprising either a water-soluble hydroxylic compound or melamine-formaldehyde or modified polyvinyl alcohol.

Polymers.

The composition may comprise one or more polymers. Examples are optionally modified carboxymethylcellulose, modified polyglucans, poly(vinyl-pyrrolidone), poly(ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid co-polymers.

The composition may comprise one or more amphiphilic cleaning polymers. Such polymers have balanced hydrophilic and hydrophobic properties such that they remove grease particles from fabrics and surfaces. Suitable amphiphilic alkoxylated grease cleaning polymers comprise a core structure and a plurality of alkoxylate groups attached to that core structure. These may comprise alkoxylated polyalkylenimines, especially ethoxylated polyethylene imines or polyethyleneimines having an inner polyethylene oxide block and an outer polypropylene oxide block. Typically, these may be incorporated into the compositions of the invention in amounts of from 0.005 to 10 wt %, generally from 0.5 to 8 wt %.

Zwitterionic Polyamine:

The composition may comprise a zwitterionic polyamine that is a modified hexamethylenediamine. The modification of the hexamethylenediamine includes: (1) one or two alkoxylation modifications per nitrogen atom of the hexamethylenediamine. The alkoxylation modification consisting of the replacement of a hydrogen atom on the nitrogen of the hexamethylenediamine by a (poly)alkoxylene chain having an average of about 1 to about 40 alkoxy moieties per modification, wherein the terminal alkoxy moiety of the alkoxylene chain is capped with hydrogen, a C1-C4 alkyl, sulfates, carbonates, or mixtures thereof; (2) a substitution of one C1-C4 alkyl moiety and one or two alkoxylation modifications per nitrogen atom of the hexamethylenediamine. The alkoxylation modification consisting of the replacement of a hydrogen atom by a (poly)alkoxylene chain having an average of about 1 to about 40 alkoxy moieties per modification wherein the terminal alkoxy moiety of the alkoxylene chain is capped with hydrogen, a C1-C4 alkyl or mixtures thereof; or (3) a combination thereof.

Amphiphilic Graft Copolymer:

Other suitable polymers include amphiphilic graft copolymers. Preferred amphiphilic graft co-polymer(s) comprise (i) polyethylene glycol backbone; and (ii) and at least one pendant moiety selected from polyvinyl acetate, polyvinyl alcohol and mixtures thereof. An example of amphiphilic graft co-polymer is Sokalan HP22, supplied from BASF. Other suitable polymers include random graft copolymers, preferably a polyvinyl acetate grafted polyethylene oxide copolymer having a polyethylene oxide backbone and multiple polyvinyl acetate side chains. The molecular weight of the polyethylene oxide backbone is preferably about 6000 and the weight ratio of the polyethylene oxide to polyvinyl acetate is about 40 to 60 and less than or equal to 1 grafting point per 50 ethylene oxide units. Typically, these are incorporated into the compositions of the invention in amounts from 0.005 to 10 wt %, more usually from 0.05 to 8 wt %.

Soil Release Polymers:

The composition may comprise one or more soil release polymers. Examples include soil release polymers having a structure as defined by one of the following Formula (VI), (VII) or (VIII):

$$-[(OCHR^1—CHR^2)_a—O—OC\text{-}Ar\text{-}CO—]_d \qquad (VI)$$

$$-[(OCHR^3—CHR^4)_b—O—OC—sAr—CO—]_e \qquad (VII)$$

$$-[(OCHR^5—CHR^6)_c—OR^7]_f \qquad (VIII)$$

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are polyester soil release polymers such as Repel-o-tex polymers, including Repel-o-tex SF, SF-2 and SRP6 supplied by Rhodia. Other suitable soil release polymers include Texcare polymers, including Texcare SRA100, SRA300, SRN100, SRN170, SRN240, SRN260, SRN300 and SRN325 supplied by Clariant. Other suitable soil release polymers are Marloquest polymers, such as Marloquest SL supplied by Sasol.

Known polymeric soil release agents, hereinafter "SRA" or "SRA's", can optionally be employed in the present detergent compositions. If utilized, SRA's will generally comprise from 0.01% to 10.0%, typically from 0.1% to 5%, preferably from 0.2% to 3.0% by weight, of the composition.

SRA's can include, for example, a variety of charged, e.g., anionic or even cationic (see U.S. Pat. No. 4,956,447), as well as noncharged monomer units and structures may be linear, branched or even star-shaped. Examples of SRAs are described in U.S. Pat. Nos. 4,968,451; 4,711,730; 4,721,580; 4,702,857; 4,877,896; 3,959,230; 3,893,929; 4,000,093; 5,415,807; 4,201,824; 4,240,918; 4,525,524; 4,201,824; 4,579,681; and 4,787,989; European Patent Application 0 219 048; 279,134 A; 457,205 A; and DE 2,335,044.

Carboxylate Polymer:

The composition may comprise a carboxylate polymer, such as a maleate/acrylate random copolymer or polyacrylate homopolymer. Suitable carboxylate polymers include: polyacrylate homopolymers having a molecular weight of from 4,000 Da to 9,000 Da; maleate/acrylate random copolymers having a molecular weight of from 50,000 Da to 100,000 Da, or from 60,000 Da to 80,000 Da.

Alternatively, these materials may comprise polyacrylates having one ethoxy side-chain per every 7-8 acrylate units. The side-chains are of the formula $—(CH_2CH_2O)_m(CH_2)_nCH_3$ wherein m is 2-3 and n is 6-12. The side-chains are ester-linked to the polyacrylate "backbone" to provide a "comb" polymer type structure. The molecular weight can vary, but is typically in the range of about 2000 to about 50,000. Such alkoxylated polycarboxylates can comprise from about 0.05% to about 10%, by weight, of the compositions herein.

Such carboxylate based polymers can advantageously be utilized at levels from about 0.1% to about 7%, by weight, in the compositions herein, Suitable polymeric dispersing agents include carboxylate polymer such as a maleate/acrylate random copolymer or polyacrylate homopolymer. Preferably the carboxylate polymer is a polyacrylate homopolymer having a molecular weight of from 4,000 Daltons to 9,000 Daltons, or maleate/acrylate copolymer with a molecular weight 60,000 Daltons to 80,000 Daltons. Polymeric polycarboxylates and polyethylene glycols, can also be used. Polyalkylene glycol-based graft polymer may prepared from the polyalkylene glycol-based compound and the monomer material, wherein the monomer material includes the carboxyl group-containing monomer and the optional additional monomer(s). Optional additional monomers not classified as a carboxyl group-containing monomer include sulfonic acid group-containing monomers, amino group-containing monomers, allylamine monomers, quaternized allylamine monomers, N vinyl monomers, hydroxyl group-containing monomers, vinylaryl monomers, isobutylene monomers, vinyl acetate monomers, salts of any of these, derivatives of any of these, and mixtures thereof.

Alkoxylated Polyamine-Based Polymers:

The composition may comprise alkoxylated polyamines. Such materials include but are not limited to ethoxylated polyethyleneimine, ethoxylated hexamethylene diamine, and sulfated versions thereof. Polypropoxylated derivatives are also included. A wide variety of amines and polyalkyleneimines can be alkoxylated to various degrees, and optionally further modified to provide the abovementioned benefits. A useful example is 600 g/mol polyethyleneimine core ethoxylated to 20 EO groups per NH. A preferred ethoxylated polyethyleneimine is PE-20 available from BASF.

Useful alkoxylated polyamine based polymers include the alkoxylated polyethylene imine type where said alkoxylated polyalkyleneimine has a polyalkyleneimine core with one or more side chains bonded to at least one nitrogen atom in the polyalkyleneimine core, wherein said alkoxylated polyalkyleneimine has an empirical formula (I) of $(PEI)_a$-$(EO)_b$-$R_1$, wherein a is the average number-average molecular weight ($MW_{PEI}$) of the polyalkyleneimine core of the alkoxylated polyalkyleneimine and is in the range of from 100 to 100,000 Daltons, wherein b is the average degree of ethoxylation in said one or more side chains of the alkoxylated polyalkyleneimine and is in the range of from 5 to 40, and wherein $R_1$ is independently selected from the group consisting of hydrogen, $C_1$-$C_4$ alkyls, and combinations thereof.

Other suitable alkoxylated polyalkyleneimine include those wherein said alkoxylated polyalkyleneimine has a polyalkyleneimine core with one or more side chains bonded to at least one nitrogen atom in the polyalkyleneimine core, wherein the alkoxylated polyalkyleneimine has an empirical formula (II) of $(PEI)_o$-$(EO)_m(PO)_n$-$R_2$ or $(PEI)_o$-$(PO)_n(EO)_m$-$R_2$, wherein o is the average number-average molecular weight ($MW_{PEI}$) of the polyalkyleneimine core of the alkoxylated polyalkyleneimine and is in the range of from 100 to 100,000 Daltons, wherein m is the average degree of ethoxylation in said one or more side chains of the alkoxylated polyalkyleneimine which ranges from 10 to 50, wherein n is the average degree of propoxylation in said one or more side chains of the alkoxylated polyalkyleneimine which ranges from 1 to 50, and wherein $R_2$ is independently selected from the group consisting of hydrogen, $C_1$-$C_4$ alkyls, and combinations thereof.

Cellulosic Polymer:

Cellulosic polymers may be used according to the invention. Suitable cellulosic polymers are selected from alkyl cellulose, alkyl alkoxyalkyl cellulose, carboxyalkyl cellulose, alkyl carboxyalkyl cellulose, sulphoalkyl cellulose, more preferably selected from carboxymethyl cellulose, methyl cellulose, methyl hydroxyethyl cellulose, methyl carboxymethyl cellulose, and mixtures thereof. Suitable carboxymethyl celluloses have a degree of carboxymethyl substitution from 0.5 to 0.9 and a molecular weight from 100,000 Da to 300,000 Da. Suitable carboxymethyl celluloses have a degree of substitution greater than 0.65 and a degree of blockiness greater than 0.45, e.g. as described in WO09/154933.

The consumer products of the present invention may also include one or more cellulosic polymers including those selected from alkyl cellulose, alkylalkoxyalkyl cellulose, carboxyalkyl cellulose, alkyl carboxyalkyl cellulose. In one aspect, the cellulosic polymers are selected from the group comprising carboxymethyl cellulose, methyl cellulose, methyl hydroxyethyl cellulose, methyl carboxymethyl cellulose, and mixtures thereof. In one aspect, the carboxymethyl cellulose has a degree of carboxymethyl substitution from 0.5 to 0.9 and a molecular weight from 100,000 Da to 300,000 Da. Examples of carboxymethylcellulose polymers are Carboxymethyl cellulose commercially sold by CPKelko as Finnfix®GDA, hydrophobically modified carboxymethyl cellulose, for example the alkyl ketene dimer derivative of carboxymethylcellulose sold commercially by CPKelco as Finnfix®SH1, or the blocky carboxymethylcellulose sold commercially by CPKelco as Finnfix®V.

Cationic Polymers:

Cationic polymers may also be used according to the invention. Suitable cationic polymers will have cationic charge densities of at least 0.5 meq/gm, in another embodiment at least 0.9 meq/gm, in another embodiment at least 1.2 meq/gm, in yet another embodiment at least 1.5 meq/gm, but in one embodiment also less than 7 meq/gm, and in another embodiment less than 5 meq/gm, at the pH of intended use of the composition, which pH will generally range from pH 3 to pH 9, in one embodiment between pH 4 and pH 8. Herein, "cationic charge density" of a polymer refers to the ratio of the number of positive charges on the polymer to the molecular weight of the polymer. The average molecular weight of such suitable cationic polymers will generally be between 10,000 and 10 million, in one embodiment between 50,000 and 5 million, and in another embodiment between 100,000 and 3 million.

Suitable cationic polymers for use in the compositions of the present invention contain cationic nitrogen-containing moieties such as quaternary ammonium or cationic protonated amino moieties. Any anionic counterions can be used in association with the cationic polymers so long as the polymers remain soluble in water, in the composition, or in a coacervate phase of the composition, and so long as the counterions are physically and chemically compatible with the essential components of the composition or do not otherwise unduly impair product performance, stability or aesthetics. Nonlimiting examples of such counterions include halides (e.g., chloride, fluoride, bromide, iodide), sulfate and methylsulfate.

Nonlimiting examples of such polymers are described in the CTFA Cosmetic Ingredient Dictionary, 3rd edition, edited by Estrin, Crosley, and Haynes, (The Cosmetic, Toiletry, and Fragrance Association, Inc., Washington, D.C. (1982)).

Especially useful cationic polymers which may be used according to the invention include wherein said cationic polymer comprises a polymer selected from the group consisting of cationic celluloses, cationic guars, poly(acrylamide-co-diallyldimethylammonium chloride), poly(acrylamide-co-diallyldimethylammonium chloride-co-acrylic acid), poly(acrylamide-co-methacryloamidopropyl-pentamethyl-1,3-propylene-2-ol-ammonium dichloride), poly(acrylamide-co-N,N-dimethylaminoethyl acrylate) and its quaternized derivatives, poly(acrylamide-co-N,N-dimethylaminoethyl methacrylate) and its quaternized derivatives, poly(acrylamide-methacrylamidopropyltrimethyl ammonium chloride), poly(acrylamide-methacrylamidopropyltrimethyl ammonium chloride-co-acrylic acid), poly(diallyldimethyl ammonium chloride), poly(diallyldimethylammonium chloride-co-acrylic acid), poly(ethyl methacrylate-co-oleyl methacrylate-co-diethylaminoethyl methacrylate) and its quaternized derivatives, poly(ethyl methacrylate-co-dimethylaminoethyl methacrylate) and its quaternized derivatives, poly(hydroxpropylacrylate-co-methacrylamidopropyltrimethylammonium chloride) and its quaternized derivatives, poly(hydroxyethylacrylate-co-dimethyl aminoethyl methacrylate) and its quaternized derivatives, poly(methylacrylamide-co-dimethylaminoethyl acrylate) and its quaternized derivatives, poly(methacrylate-co-methacrylamidopropyltrimethyl ammonium chloride), poly (vinylformamide-co-acrylic acid-co-diallyldimethylammonium chloride), poly(vinylformamide-co-diallyldimethylammonium chloride), poly (vinylpyrrolidone-co-acrylamide-co-vinyl imidazole) and its quaternized derivatives, poly(vinylpyrrolidone-co-dimethylaminoethyl methacrylate) and its quaternized derivatives, poly(vinylpyrrolidone-co-methacrylamide-co-vinyl imidazole) and its quaternized derivatives, poly(vinylpyrrolidone-co-vinyl imidazole) and its quaternized derivatives, polyethyleneimine and including its quaternized derivatives, and mixtures thereof.

Other suitable cationic polymers for use in the composition include polysaccharide polymers, cationic guar gum derivatives, quaternary nitrogen-containing cellulose ethers, synthetic polymers, copolymers of etherified cellulose, guar and starch. When used, the cationic polymers herein are either soluble in the composition or are soluble in a complex coacervate phase in the composition formed by the cationic polymer and the anionic, amphoteric and/or zwitterionic surfactant component described hereinbefore. Complex coacervates of the cationic polymer can also be formed with other charged materials in the composition.

Suitable cationic polymers are described in U.S. Pat. Nos. 3,962,418; 3,958,581; and U.S. Publication No. 2007/0207109A1.

Dye Transfer Inhibitor (DTI).

The composition may comprise one or more dye transfer inhibiting agents. In one embodiment of the invention the inventors have surprisingly found that compositions comprising polymeric dye transfer inhibiting agents in addition to the specified dye give improved performance. This is surprising because these polymers prevent dye deposition. Suitable dye transfer inhibitors include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Suitable examples include PVP-K15, PVP-K30, ChromaBond S-400, ChromaBond S-403E and Chromabond S-100 from Ashland Aqualon, and Sokalan HP165, Sokalan HP50, Sokalan HP53, Sokalan HP59, Sokalan® HP 56K, Sokalan® HP 66 from BASF. The dye control agent may be selected from (i) a sulfonated phenol/formaldehyde polymer; (ii) a urea derivative; (iii) polymers of ethylenically unsaturated monomers, where the polymers are molecularly imprinted with dye; (iv) fibers consisting of water-insoluble polyamide, wherein the fibers have an average diameter of not more than about 2 μm; (v) a polymer obtainable from polymerizing benzoxazine monomer compounds; and (vi) combinations thereof. Other suitable DTIs are as described in WO2012/004134. When present in a subject composition, the dye transfer inhibiting agents may be present at levels from about 0.0001% to about 10%, from about 0.01% to about 5% or even from about 0.1% to about 3% by weight of the composition.

Other Water-Soluble Polymers:

Examples of water soluble polymers include but are not limited to polyvinyl alcohols (PVA), modified PVAs; polyvinyl pyrrolidone; PVA copolymers such as PVA/polyvinyl pyrrolidone and PVA/polyvinyl amine; partially hydrolyzed polyvinyl acetate; polyalkylene oxides such as polyethylene oxide; polyethylene glycols; acrylamide; acrylic acid; cellulose, alkyl cellulosics such as methyl cellulose, ethyl cellulose and propyl cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides including starch, modified starch; gelatin; alginates; xyloglucans, other hemicellulosic polysaccharides including xylan, glucuronoxylan, arabinoxylan, mannan, glucomannan and galactoglucomannan; and natural gums such as pectin, xanthan, and carrageenan, locus bean, arabic, tragacanth; and combinations thereof.

Oligoamines:

Non-limiting examples of amines include, but are not limited to, etheramines, cyclic amines, polyamines, oligoamines (e.g., triamines, diamines, pentamines, tetraamines), or combinations thereof. The compositions described herein may comprise an amine selected from the group consisting of oligoamines, etheramines, cyclic amines, and combinations thereof. In some aspects, the amine is not an alkanolamine. In some aspects, the amine is not a polyalkyleneimine.

Examples of suitable oligoamines include Preferably the composition comprises oligoamines. Suitable oligoamines according to the present disclosure may include diethylenetriamine (DETA), 4-methyl diethylenetriamine (4-MeDETA), dipropylenetriamine (DPTA), 5-methyl dipropylenetriamine (5-MeDPTA), triethylenetetraamine (TETA), 4-methyl triethylenetetraamine (4-MeTETA), 4,7-dimethyl triethylenetetraamine (4,7-Me2TETA), 1,1,4,7,7-pentamethyl diethylenetriamine (M5-DETA), tripropylenetetraamine (TPTA), tetraethylenepentaamine (TEPA), tetrapropylenepentaamine (TPPA), pentaethylenehexaamine (PEHA), pentapropylenehexaamine (PPHA), hexaethyleneheptaamine (HEHA), hexapropyleneheptaamine (HPHA), N,N'-Bis(3-aminopropyl)ethylenediamine, 1,1,4,7,7-pentamethyl diethylenetriamine (M5-DETA), dipropylenetriamine (DPTA) or mixtures thereof most preferably diethylenetriamine (DETA). DETA may be preferred due to its low molecular weight and/or relatively low cost to produce.

The oligoamines of the present disclosure may have a molecular weight of between about 100 to about 1200 Da, or from about 100 to about 900 Da, or from about 100 to about 600 Da, or from about 100 to about 400 Da, preferably between about 100 Da and about 250 Da, most preferably between about 100 Da and about 175 Da, or even between about 100 Da and about 150 Da. For purposes of the present disclosure, the molecular weight is determined using the free base form of the oligoamine.

Etheramines:

The cleaning compositions described herein may contain an etheramine. The cleaning compositions may contain from about 0.1% to about 10%, or from about 0.2% to about 5%, or from about 0.5% to about 4%, by weight of the composition, of an etheramine.

The etheramines of the present disclosure may have a weight average molecular weight of less than about grams/mole 1000 grams/mole, or from about 100 to about 800 grams/mole, or from about 200 to about 450 grams/mole, or from about 290 to about 1000 grams/mole, or from about 290 to about 900 grams/mole, or from about 300 to about 700 grams/mole, or from about 300 to about 450 grams/mole. The etheramines of the present invention may have a weight average molecular weight of from about 150, or from about 200, or from about 350, or from about 500 grams/mole, to about 1000, or to about 900, or to about 800 grams/mole.

Enzymes.

Preferably the composition comprises one or more enzymes. Preferred enzymes provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, 13-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in the composition, the aforementioned additional enzymes may be present at levels from about 0.00001% to about 2%, from about 0.0001% to about 1% or even from about 0.001% to about 0.5% enzyme protein by weight of the composition.

Protease

The composition of the invention can comprise a protease in addition to the protease of the invention. A mixture of two or more proteases can contribute to an enhanced cleaning across a broader temperature, cycle duration, and/or substrate range, and provide superior shine benefits, especially when used in conjunction with an anti-redeposition agent and/or a sulfonated polymer.

Suitable proteases for use in combination with the variant proteases of the invention include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), especially those derived from *Bacillus*, such as *Bacillus* sp., *B. lentus, B. alkalophilus, B. subtilis, B. amyloliquefaciens, B. pumilus, B. gibsonii*, and *B. akibaii* described in WO2004067737, WO2015091989, WO2015091990, WO2015024739, WO2015143360, U.S. Pat. Nos. 6,312,936 B1, 5,679,630, 4,760,025, DE102006022216A1, DE102006022224A1, WO2015089447, WO2015089441, WO2016066756, WO2016066757, WO2016069557, WO2016069563, WO2016069569 and WO2016174234. Specifically, mutations S9R, A15T, V66A, A188P, V1991, Q239R, N255D (savinase numbering system).

(b) trypsin-type or chymotrypsin-type proteases, such as trypsin (e.g., of porcine or bovine origin), including the *Fusarium* protease described in WO 89/06270 and the chymotrypsin proteases derived from Cellumonas described in WO 05/052161 and WO 05/052146.

(c) metalloproteases, especially those derived from *Bacillus amyloliquefaciens* described in WO07/044993A2; from *Bacillus, Brevibacillus, Thermo actinomyces, Geobacillus, Paenibacillus, Lysinibacillus* or *Streptomyces* spp. Described in WO2014194032, WO2014194054 and WO2014194117; from *Kribella alluminosa* described in WO2015193488; and from *Streptomyces* and *Lysobacter* described in WO2016075078.

(d) protease having at least 90% identity to the subtilase from *Bacillus* sp. TY145, NCIMB 40339, described in WO92/17577 (Novozymes A/S), including the variants of this *Bacillus* sp TY145 subtilase described in WO2015024739, and WO2016066757.

Especially preferred additional proteases for the detergent of the invention are polypeptides as illustrated in WO00/37627, which is incorporated herein by reference.

Suitable commercially available additional protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase®, Coronase®, Blaze®, Blaze Ultra® and Esperase® by Novozymes A/S (Denmark); those sold under the tradename Maxatase®, Maxacal®, Maxapem®, Properase®, Purafect®, Purafect Prime®, Purafect Ox®, FN3®, FN4®, Excellase®, Ultimase® and Purafect OXP® by Dupont; those sold under the tradename Opticlean® and Optimase® by Solvay Enzymes; and those available from Henkel/Kemira, namely BLAP R and BLAP F49 and KAP from Kao.

Especially preferred for use herein in combination with the variant protease of the invention are commercial proteases selected from the group consisting of Properase®, Blaze®, Ultimase®, Everlase®, Savinase®, Excellase®, Blaze Ultra®, BLAP and BLAP variants.

Preferred levels of protease in the product of the invention include from about 0.05 to about 10, more preferably from about 0.5 to about 7 and especially from about 1 to about 6 mg of active protease/g of composition.

Amylases

Preferably the composition of the invention may comprise an amylase. Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCBI 12289, NCBI 12512, NCBI 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) variants described in U.S. Pat. No. 5,856,164 and WO99/23211, WO 96/23873, WO00/60060, WO06/002643 and WO2017/192657.

(b) variants described in WO2011/100410 and WO2013/003659.

(c) variants in U.S. Pat. No. 6,093,562.

(d) variants described in WO 09/149130.

(e) variants described in WO10/115021.

(f) variants in WO2016091688.

(g) variants described in WO2014099523.

(h) variants in WO2009149271.

(j) variants described in WO2016180748.

(k) variants described in WO2018060216.

Preferably the amylase is an engineered enzyme, wherein one or more of the amino acids prone to bleach oxidation have been substituted by an amino acid less prone to oxidation. In particular it is preferred that methionine residues are substituted with any other amino acid. In particular it is preferred that the methionine most prone to oxidation is substituted.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL®, ATLANTIC®, ACHIEVE ALPHA®,AMPLIFY® PRIME, INTENSA® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE®, PREFERENZ S® series (including PREFERENZ S1000® and PREFERENZ S2000® and PURASTAR OXAM® (DuPont., Palo Alto, California) and KAM® (Kao, 14-10 Nihonbashi Kayabacho, 1-chome, Chuo-ku Tokyo 103-8210, Japan).

Preferably, the product of the invention comprises at least 0.01 mg, preferably from about 0.05 to about 10, more preferably from about 0.1 to about 6, especially from about 0.2 to about 5 mg of active amylase/g of composition.

Preferably, the protease and/or amylase of the composition of the invention are in the form of granulates, the granulates comprise more than 29% of sodium sulfate by weight of the granulate and/or the sodium sulfate and the active enzyme (protease and/or amylase) are in a weight ratio of between 3:1 and 100:1 or preferably between 4:1 and 30:1 or more preferably between 5:1 and 20:1.

Lipase

The enzyme system preferably further comprises a lipase. The presence of oils and/or grease can further increase the resiliency of stains comprising mannans and other polysaccharides. As such, the presence of lipase in the enzyme package can further improve the removal of such stains. Suitable lipases include those of bacterial, fungal or synthetic origin, and variants thereof. Chemically modified or protein engineered mutants are also suitable. Examples of suitable lipases include lipases from *Humicola* (synonym *Thermomyces*), e.g., from *H. lanuginosa* (*T. lanuginosus*).

The lipase may be a "first cycle lipase", e.g. such as those described in WO06/090335 and WO 13/116261. In one aspect, the lipase is a first-wash lipase, preferably a variant of the wild-type lipase from *Thermomyces lanuginosus* comprising T231R and/or N233R mutations. Preferred lipases include those sold under the tradenames Lipex®, Lipolex® and Lipoclean® by Novozymes, Bagsvaerd, Denmark.

Other suitable lipases include: Liprl 139, e.g. as described in WO2013/171241; TfuLip2, e.g. as described in WO2011/084412 and WO2013/033318; *Pseudomonas stutzeri* lipase, e.g. as described in WO2018228880; *Microbulbifer thermotolerans* lipase, e.g. as described in WO2018228881; *Sulfobacillus acidocaldarius* lipase, e.g. as described in EP3299457; LIP062 lipase e.g. as described in WO2018209026; PinLip lipase e.g. as described in WO2017036901 and *Absidia* sp. lipase e.g. as described in WO2017005798.

Suitable lipases are commercially available from Novozymes, for example as Lipex Evity 100L, Lipex Evity 200L (both liquid raw materials) and Lipex Evity 105T (a granulate). These lipases have different structures to the products Lipex 100L, Lipex 100T and Lipex Evity 100T which are outside the scope of the invention.

Cellulases

The consumer products can comprise cellulases of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and 5,691,178. Suitable cellulases include the alkaline or neutral cellulases having color care benefits. Commercially available cellulases include CELLUZYME®, CAREZYME® and CAREZYME PREMIUM (Novozymes A/S), CLAZINASE®, and PURADAX HA® (Genencor International Inc.), and KAC-500(B)® (Kao Corporation).

Preferred cellulases include:

a) Variants in WO2017084560.

b) Variants in WO2017106676.

The bacterial cleaning cellulase may be a glycosyl hydrolase having enzymatic activity towards amorphous cellulose substrates, wherein the glycosyl hydrolase is selected from GH families 5, 7, 12, 16, 44 or 74. Suitable glycosyl hydrolases may also be selected from the group consisting of: GH family 44 glycosyl hydrolases from *Paenibacillus polyxyma* (wild-type) such as XYG1006 described in U.S. Pat. No. 7,361,736 or are variants thereof. GH family 12 glycosyl hydrolases from *Bacillus licheniformis* (wild-type) described in U.S. Pat. No. 6,268,197 or are variants thereof; GH family 5 glycosyl hydrolases from *Bacillus agaradhaerens* (wild type) or variants thereof; GH family 5 glycosyl hydrolases from *Paenibacillus* (wild type) such as XYG1034 and XYG 1022 described in U.S. Pat. No. 6,630,340 or variants thereof; GH family 74 glycosyl hydrolases from *Jonesia* sp. (wild type) such as XYG1020 described in WO 2002/077242 or variants thereof; and GH family 74 glycosyl hydrolases from *Trichoderma Reesei* (wild type), or variants thereof. Suitable bacterial cleaning cellulases are sold under the tradenames Celluclean® and Whitezyme® (Novozymes A/S, Bagsvaerd, Denmark),In one aspect, the composition may comprise a fungal cleaning cellulase belonging to glycosyl hydrolase family 45 having a molecular weight of from 17 kDa to 30 kDa, for example the endoglucanases sold under the tradename Biotouch® NCD, DCC, DCL and FLX1 (AB Enzymes, Darmstadt, Germany). Additionally, preferred cellulases include the ones covered in WO2016066896.

Mannanase

As used herein, the term "mannanase" or "galactomannanase" denotes a mannanase enzyme defined according to that known in the art as mannan endo-1,4-beta-mannosidase and having the alternative names beta-mannanase and endo-1,4-mannanase and catalysing hydrolysis of 1,4-beta-D-mannosidic linkages in mannans, galactomannans, glucomannans, and galactoglucomannans. Mannanases are classified according to the Enzyme Nomenclature as EC 3.2.1.78.

Suitable examples are described in WO2015040159.

Additional preferred mannanases include those sold under the tradenames Mannaway® (all from Novozymes A/S, Bagsvaerd, Denmark), and Purabrite®, Effectenz®, Preferenz® (Genencor International Inc., Palo Alto, California) and Biotouch® (AB Enzymes, Darmstadt, Germany).

Pectate Lyases.

Other preferred enzymes include pectate lyases sold under the tradenames Pectawash®, Pectaway®, Xpect®.

Nuclease Enzyme

The composition may comprise a nuclease enzyme. The nuclease enzyme is an enzyme capable of cleaving the phosphodiester bonds between the nucleotide sub-units of nucleic acids. The nuclease enzyme herein is preferably a deoxyribonuclease or ribonuclease enzyme or a functional fragment thereof. By functional fragment or part is meant the portion of the nuclease enzyme that catalyzes the cleavage of phosphodiester linkages in the DNA backbone and so is a region of said nuclease protein that retains catalytic activity. Thus it includes truncated, but functional versions, of the enzyme and/or variants and/or derivatives and/or homologues whose functionality is maintained.

Preferably the nuclease enzyme is a deoxyribonuclease, preferably selected from any of the classes E.C. 3.1.21.x, where x=1, 2, 3, 4, 5, 6, 7, 8 or 9, E.C. 3.1.22.y where y=1, 2, 4 or 5, E.C. 3.1.30.z where z=1 or 2, E.C. 3.1.31.1 and mixtures thereof. All Nuclease enzymes may include superoxide dismutase in minor amounts.

Galactanase

The enzyme system may comprise an extracellular polymer-degrading enzyme that includes an endo-beta-1,6-galactanase enzyme. The term "endo-beta-1,6-galactanase" or "a polypeptide having endo-beta-1,6-galactanase activity" means a endo-beta-1,6-galactanase activity (EC 3.2.1.164) from the glycoside hydrolase family 30 that catalyzes the hydrolytic cleavage of 1,6-3-D-galactooligosaccharides with a degree of polymerization (DP) higher than 3, and their acidic derivatives with 4-O-methylglucosyluronate or glucosyluronate groups at the non-reducing terminals. For purposes of the present disclosure, endo-beta-1,6-galactanase activity is determined according to the procedure described in WO 2015185689 in Assay I. Suitable examples from class EC 3.2.1.164 are described in WO 2015185689.

Other Enzymes

The enzyme system can comprise other enzymes. Suitable enzymes provide cleaning performance and/or fabric care benefits. Examples of other suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases,13-glucanases, arabinosidases, hyaluronidase, chondroitinase, laccase, and known amylases, or combinations thereof. A preferred enzyme system further comprises a cocktail of conventional detersive enzymes such as protease, lipase, cutinase and/or cellulase in conjunction with amylase. Detersive enzymes are described in greater detail in U.S. Pat. No. 6,579,839.

Xanthan Endoglucanase & Xanthan Lyase

The term xanthan endoglucanase denotes an enzyme exhibiting endo-beta-1,4-glucanase activity that is capable of catalysing hydrolysis of the 1,4-linked β-D-glucose polymeric backbone of xanthan gum in conjunction with a suitable xanthan lyase enzyme. The xanthan endoglucanase in accordance with the invention has endo-beta-1,4-glucanase activity.

The term "xanthan lyase" denotes an enzyme that cleaves the β-D-mannosyl-β-D-1,4-glucuronosyl bond of xanthan and have been described in the literature. Xanthan lyases are classified according to the Enzyme Nomenclature as EC 4.2.2.12, and are known to be produced by many xanthan-degrading bacteria including *Bacillus*, Corynebacterium and *Paenibacillus* species. The xanthan lyase in accordance with the invention has xanthan lyase activity.

Bleaching Agents.

It may be preferred for the composition to comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent or mixtures of bleaching agents by weight of the subject composition. Examples of suitable bleaching agents include:

(1) photobleaches for example sulfonated zinc phthalocyanine sulfonated aluminium phthalocyanines, xanthene dyes, thioxanthones, and mixtures thereof;

(2) pre-formed peracids: Suitable preformed peracids include, but are not limited to compounds selected from the group consisting of pre-formed peroxyacids or salts thereof typically a percarboxylic acids and salts, percarbonic acids and salts, perimidic acids and salts, peroxymonosulfuric acids and salts, for example, Oxone®, and mixtures thereof.

Particularly preferred peroxyacids are phthalimido-peroxy-alkanoic acids, in particular c-phthalimido peroxy hexanoic acid (PAP). Preferably, the peroxyacid or salt thereof has a melting point in the range of from 30° C. to 60° C.

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. When employed, inorganic perhydrate salts are typically present in amounts of from 0.05 to 40 wt %, or 1 to 30 wt % of the overall fabric and home care product and are typically incorporated into such fabric and home care products as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having R—(C═O)—L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS).

(5) Bleach Catalysts. The compositions of the present invention may also include one or more bleach catalysts capable of accepting an oxygen atom from a peroxyacid and/or salt thereof, and transferring the oxygen atom to an oxidizeable substrate. Suitable bleach catalysts include, but are not limited to: iminium cations and polyions; iminium zwitterions; modified amines; modified amine oxides; N-sulphonyl imines; N-phosphonyl imines; N-acyl imines; thiadiazole dioxides; perfluoroimines; cyclic sugar ketones and alpha amino-ketones and mixtures thereof. One particularly preferred catalyst is acyl hydrazone type such as 442424(2-hydroxyphenylmethyl)methylene)-hydrazinyl)-2-oxoethyl)-4-methylchloride.

(6) The composition may preferably comprise catalytic metal complexes. One preferred type of metal-containing bleach catalyst is a catalyst system comprising a transition metal cation of defined bleach catalytic activity, such as copper, iron, titanium, ruthenium, tungsten, molybdenum, or manganese cations.

If desired, the compositions herein can be catalyzed by means of a manganese compound. Such compounds and levels of use are well known in the art and include, for example, the manganese-based catalysts disclosed in U.S. Pat. No. 5,576,282. In some embodiments, an additional source of oxidant in the composition is not present, molecular oxygen from air providing the oxidative source.

Cobalt bleach catalysts useful herein are known, and are described, for example, in U.S. Pat. Nos. 5,597,936; 5,595,967.

Builders.

Preferably the composition may comprise one or more builders or a builder system. When a builder is used, the composition of the invention will typically comprise at least 1%, from 2% to 60% builder. It may be preferred that the composition comprises low levels of phosphate salt and/or zeolite, for example from 1 to 10 or 5 wt %. The composition may even be substantially free of strong builder; substantially free of strong builder means "no deliberately added" zeolite and/or phosphate. Typical zeolite builders include zeolite A, zeolite P and zeolite MAP. A typical phosphate builder is sodium tri-polyphosphate.

Organic Acid

The detergent comprises one or more organic acids selected from the group consisting of acetic acid, adipic acid, aspartic acid, carboxymethyloxymalonic acid, carboxymethyloxysuccinic acid, citric acid, formic acid, glutaric acid, hydroxyethyliminodiacetic acid, iminodiacetic acid, lactic acid, maleic acid, malic acid, malonic acid, oxydiacetic acid, oxydisuccinic acid, succinic acid, sulfamic acid, tartaric acid, tartaric-disuccinic acid, tartaric-monosuccinic acid, or mixtures thereof.

Preferably, the detergent composition may comprise an organic acid selected from the group consisting of acetic acid, lactic acid, and citric acid.

Chelating Agent.

Preferably the composition comprises chelating agents and/or crystal growth inhibitor. Suitable molecules include copper, iron and/or manganese chelating agents and mixtures thereof. Suitable molecules include hydroxamic acids, aminocarboxylates, aminophosphonates, succinates, salts thereof, and mixtures thereof. Non-limiting examples of suitable chelants for use herein include ethylenediaminetetracetates, N-(hydroxyethyl)ethylenediaminetriacetates, nitrilotriacetates, ethylenediamine tetraproprionates, triethylenetetraaminehexacetates, diethylenetriamine-pentaacetates, ethanoldiglycines, ethylenediaminetetrakis (methylenephosphonates), diethylenetriamine penta(methylene phosphonic acid) (DTPMP), ethylenediamine disuccinate (EDDS), hydroxyethanedimethylenephosphonic acid (HEDP), methylglycinediacetic acid (MGDA), diethylenetriaminepentaacetic acid (DTPA), N,N-Dicarboxymethyl glutamic acid (GLDA) and salts thereof, and mixtures thereof. Other nonlimiting examples of chelants of use in the present invention are found in U.S. Pat. Nos. 7,445,644, 7,585,376 and 2009/0176684A1. Other suitable chelating agents for use herein are the commercial DEQUEST series, and chelants from Monsanto, DuPont, and Nalco, Inc. Yet other suitable chelants include the pyridinyl N Oxide type.

Fluorescent Brightener:

Commercial fluorescent brighteners suitable for the present disclosure can be classified into subgroups, including but not limited to: derivatives of stilbene, pyrazoline, coumarin, benzoxazoles, carboxylic acid, methinecyanines, dibenzothiophene-5,5-dioxide, azoles, 5- and 6-membered-ring heterocycles, and other miscellaneous agents.

The fluorescent brightener may be selected from the group consisting of disodium 4,4'-bis{[4-anilino-6-morpholino-s-triazin-2-yl]-amino}-2,2'-stilbenedisulfonate (brightener 15, commercially available under the tradename Tinopal AMS-GX by BASF), disodium4,4'-bis{[4-anilino-6-(N-2-bis-hydroxyethyl)-s-triazine-2-yl]-amino}-2,2'-stilbenedisulonate (commercially available under the tradename Tinopal UNPA-GX by BASF), disodium 4,4'-bis{[4-anilino-6-(N-2-hydroxyethyl-N-methylamino)-s-triazine-2-yl]-amino}-2,2'-stilbenedisulfonate (commercially available under the tradename Tinopal 5B M-GX by BASF). More preferably, the fluorescent brightener is disodium 4,4'-bis{[4-anilino-6-morpholino-s-triazin-2-yl]-amino}-2,2'-stilbenedisulfonate or 2,2'-([1,1'-Biphenyl]-4,4'-diyldi-2,1-ethenediyl)bis-benzenesulfonic acid disodium salt. The brighteners may be added in particulate form or as a premix with a suitable solvent, for example nonionic surfactant, propanediol.

Enzyme Stabilizers.

The composition may preferably comprise enzyme stabilizers. Any conventional enzyme stabilizer may be used, for example by the presence of water-soluble sources of calcium and/or magnesium ions in the finished fabric and home care products that provide such ions to the enzymes. In case of aqueous compositions comprising protease, a reversible protease inhibitor, such as a boron compound including borate, or preferably 4-formyl phenylboronic acid, phenylboronic acid and derivatives thereof, or compounds such as calcium formate, sodium formate and 1,2-propane diol can be added to further improve stability.

Solvents:

The solvent system in the present compositions can be a solvent system containing water alone or mixtures of organic solvents either without or preferably with water. The compositions may optionally comprise an organic solvent. Suitable organic solvents include $C_{4-14}$ ethers and diethers, glycols, alkoxylated glycols, $C_6$-$C_{16}$ glycol ethers, alkoxylated aromatic alcohols, aromatic alcohols, aliphatic branched alcohols, alkoxylated aliphatic branched alcohols, alkoxylated linear $C_1$-$C_5$ alcohols, linear $C_1$-$C_5$ alcohols, amines, $C_8$-$C_{14}$ alkyl and cycloalkyl hydrocarbons and halohydrocarbons, and mixtures thereof. Preferred organic solvents include 1,2-propanediol, 2,3 butane diol, ethanol, glycerol, ethoxylated glycerol, dipropylene glycol, methyl propane diol and mixtures thereof 2 ethyl hexanol, 3,5,5, trimethyl-1 hexanol, and 2 propyl heptanol. Solvents may be a polyethylene or polypropylene glycol ether of glycerin. Other lower alcohols, $C_1$-$C_4$ alkanolamines such as monoethanolamine and triethanolamine, can also be used. Solvent systems can be absent, for example from anhydrous solid embodiments of the invention, but more typically are present at levels in the range of from about 0.1% to about 98%, preferably at least about 1% to about 50%, more usually from about 5% to about 25%, alternatively from about 1% to about 10% by weight of the liquid detergent composition of said organic solvent. These organic solvents may be used in conjunction with water, or they may be used without water.

Structured Liquids:

In some embodiments of the invention, the composition is in the form of a structured liquid. Such structured liquids can either be internally structured, whereby the structure is formed by primary ingredients (e.g. surfactant material) and/or externally structured by providing a three dimensional matrix structure using secondary ingredients (e.g. polymers, clay and/or silicate material), for use e.g. as thickeners. The composition may comprise a structurant, preferably from 0.01wt % to 5wt %, from 0.1wt % to 2.0wt % structurant. Examples of suitable structurants are given in US2006/0205631A1, US2005/0203213A1, U.S. Pat. Nos. 7,294,611, 6,855,680. The structurant is typically selected from the group consisting of diglycerides and triglycerides, ethylene glycol distearate, microcrystalline cellulose, cellulose-based materials, microfiber cellulose, hydrophobically modified alkali-swellable emulsions such as Polygel W30 (3VSigma), biopolymers, xanthan gum, gellan gum, hydrogenated castor oil, derivatives of hydrogenated castor oil such as non-ethoxylated derivatives thereof and mixtures thereof, in particular, those selected from the group of hydrogenated castor oil, derivatives of hydrogenated castor oil, microfibullar cellulose, hydroxyfunctional crystalline materials, long chain fatty alcohols, 12-hydroxystearic acids, clays and mixtures thereof. One preferred structurant is described in U.S. Pat. No. 6,855,680 which defines suitable hydroxyfunctional crystalline materials in detail. Preferred is hydrogenated castor oil. Some structurants have a thread-like structuring system having a range of aspect ratios. Another preferred structurant is based on cellulose and may be derived from a number of sources including biomass, wood pulp, citrus fibers and the like.

Conditioning Agents:

Suitable conditioning agents include high melting point fatty compounds. The high melting point fatty compound useful herein has a melting point of 25° C. or higher and is selected from the group consisting of fatty alcohols, fatty acids, fatty alcohol derivatives, fatty acid derivatives, and mixtures thereof. Preferred fatty acid blends may be mixtures enriched or fatty acid mixtures enriched with 2-alkyl fatty acid, preferably 2-methyl octanoic acid. Suitable conditioning agents also include nonionic polymers and conditioning oils, such as hydrocarbon oils, polyolefins, and fatty esters.

Suitable conditioning agents include those conditioning agents characterized generally as silicones (e.g., silicone oils, polyoils, cationic silicones, silicone gums, high refractive silicones, and silicone resins), organic conditioning oils (e.g., hydrocarbon oils, polyolefins, and fatty esters) or combinations thereof, or those conditioning agents which otherwise form liquid, dispersed particles in the aqueous surfactant matrix herein. The compositions of the present invention may also comprise from about 0.05% to about 3% of at least one organic conditioning oil as the conditioning agent, either alone or in combination with other conditioning agents, such as the silicones (described herein). Suitable conditioning oils include hydrocarbon oils, polyolefins, and fatty esters.

Probiotics:

The composition may comprise probiotics, such as those described in WO2009/043709.

Pearlescent Agent:

Non-limiting examples of pearlescent agents include: mica; titanium dioxide coated mica; bismuth oxychloride; fish scales; mono and diesters of alkylene glycol. The pearlescent agent may be ethyleneglycoldistearate (EGDS).

Opacifier:

In one embodiment, the composition might also comprise an opacifier. As the term is used herein, an "opacifier" is a substance added to a material in order to make the ensuing system opaque. In one preferred embodiment, the opacifier is Acusol, which is available from Dow Chemicals. Acusol opacifiers are provided in liquid form at a certain % solids level. As supplied, the pH of Acusol opacifiers ranges from 2.0 to 5.0 and particle sizes range from 0.17 to 0.45 um. In one preferred embodiment, Acusol OP303B and 301 can be used.

In yet another embodiment, the opacifier may be an inorganic opacifier. Preferably, the inorganic opacifier can be $TiO_2$, ZnO, talc, $CaCO_3$, and combination thereof. The composite opacifier-microsphere material is readily formed with a preselected specific gravity, so that there is little tendency for the material to separate.

Hydrotrope:

The composition may optionally comprise a hydrotrope in an effective amount, i.e. from about 0% to 15%, or about 1% to 10%, or about 3% to about 6%, so that compositions are compatible in water. Suitable hydrotropes for use herein include anionic-type hydrotropes, particularly sodium, potassium, and ammonium xylene sulfonate, sodium, potassium and ammonium toluene sulfonate, sodium potassium and ammonium cumene sulfonate, and mixtures thereof, as disclosed in U.S. Pat. No. 3,915,903.

Anti-Oxidant:

The composition may optionally contain an anti-oxidant present in the composition from about 0.001 to about 2% by weight. Preferably the antioxidant is present at a concentration in the range 0.01 to 0.08% by weight. Mixtures of anti-oxidants may be used.

Anti-oxidants are substances as described in Kirk-Othmer (Vol. 3, page 424) and In Ullmann's Encyclopedia (Vol. 3, page 91).

One class of anti-oxidants used in the present invention is alkylated phenols, having the general formula:

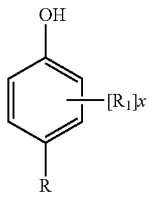

wherein R is $C_1$-$C_{22}$ linear or branched alkyl, preferably methyl or branched $C_3$-$C_6$ alkyl, $C_1$-$C_6$ alkoxy, preferably methoxy; $R_1$ is a $C_3$-$C_6$ branched alkyl, preferably tert-butyl; x is 1 or 2. Hindered phenolic compounds are a preferred type of alkylated phenols having this formula. Examples of such hindered phenol antioxidants may include, but are not limited to: 2,6-bis(1-methylpropyl)phenol; 2,6-bis(1,1-dimethylethyl)-4-methyl-phenol (also known as hydroxy butylated toluene, "BHT"); 2-(1,1-dimethylethyl)-1,4-benzenediol; 2,4-bis(1,1-dimethylethyl)-phenol; 2,6-bis(1,1-dimethylethyl)-phenol; 3,5-bis(1,1-dimethylethyl)-4-hydroxybenzene propanoic acid, methyl ester; 2-(1,1-dimethylethyl)-4-methylphenol; 2-(1,1-dimethylethyl)-4,6-dimethyl-phenol; 3,5-bis(1,1-dimethylethyl)-4-hydroxybenzenepropanoic acid, 1,1'-[2,2-bis [[3-[3,5-bis(1,1-dimethylethyl)-4-hydroxyphenyl]-1-oxopropoxy] methyl]-1,3-propanediyl]ester; 3,5-bis(1,1-dimethylethyl)-4-hydroxybenzeneprop anoic acid, octadecyl ester; 2,2'-methylenebis [6-(1,1-dimethylethyl)-4-methylphenol; 2-(1,1-dimethylethyl)-phenol; 2,4,6-tris(1,1-dimethylethyl)-phenol; 4,4'-methylenebis [2,6-bis(1,1-dimethylethyl)-phenol; 4,4',4"-[(2,4,6-trimethyl-1,3,5-benzenetriyl)tris (methylene)]tris [2,6-bis(1,1-dimethylethyl)-phenol]; N,N'-1,6-hexanediylbis,]3,5-bis(1,1-dimethylethyl)-4-hydroxybenzenepropanamide; 3,5-bis(1,1-dimethylethyl)-4-hydroxy benzoic acid, hexadecyl ester; P-[[3,5-bis(1,1-dimethylethyl)-4-hydroxyphenyl]methylphosphonic acid, diethyl ester; 1,3,5-tris [[3,5-bis(1,1-dimethylethyl)-4-hydroxyphenyl]methyl]-1,3,5-Triazine-2,4,6(1H,3H,5H)-trione; 3,5-bis(1,1-5dimethylethyl)-4-hydroxybenzenepropanoic acid, 2-[3-[3,5-bis(1,1-dimethylethyl)-4-hydroxyphenyl]-1-oxopropyl]hydrazide; 3-(1,1-dimethyl ethyl)-4-hydroxy-5-methylbenzenepropanoic acid, 1,1'[1,2-ethanediylbis(oxy-2,1-ethanediyl)]ester; 4-[(dimethylamino)methyl]-2,6-bis(1,1-dimethylethyl)phenol; 4-[[4,6-bis(octylthio)-1,3,5-triazin-2-yl]amino]-2,6-bis(1,1-dimethylethyl)phenol; 3,5-bis(1,1-dimethylethyl)-4-hydroxy benzene propanoic acid, 1,1'-(thiodi-2,1-ethanediyl) ester; 3,5-bis(1,1-dimethylethyl)-4-hydroxybenzoic acid, 2,4-bis(1,1-dimethylethyl)phenyl ester; 3,5-bis(1,1-dimethylethyl)-4-hydroxybenzenepropanoic acid, 1,1'-(1,6-hexanediyl)ester; 3-(1,1-dimethylethyl)-4-hydroxy-5-methylbenzenepropanoic acid, 1,1'-[2,4,8,10-tetraoxaspiro[5.5]undecane-3,9-diylbis(2,2-dimethyl-2,1-ethanediyl)]ester; 3-(1,1-dimethylethyl)-b-[3-(1,1-dimethylethyl)-4-hydroxy phenyl]-4-hydroxy-b-methylbenzenepropanoic acid, 1,1'-(1,2-ethanediyl) ester; 2-[[3,5-bis(1,1-dimethylethyl)-4-hydroxyphenyl]methyl]-2-butylpropanedioic acid, 1,3-bis(1,2,2,6,6-pentamethyl-4-piperidinyl) ester; 3,5-bis(1,1-dimethylethyl)-4-hydroxybenzenepropanoic acid, 1-[2-[3-[3,5-bis(1,1-dimethylethyl)-4-hydroxyphenyl]-1-oxopropoxy]ethyl]-2,2,6,6-tetramethyl-4-piperidinyl ester; 3,4-dihydro-2,5,7,8-tetramethyl-2-[(4R,8R)-4,8,12-trimethyltridecyl]-(2R)-2H-1-benzopyran-6-ol; 2,6-dimethylphenol; 2,3,5-trimethyl-1,4-benzenediol; 2,4,6-trimethylphenol; 2,3,6-trimethylphenol; 4,4'-(1-methylethylidene)-bis [2,6-dimethylphenol]; 1,3,5-tris [[4-(1,1-dimethylethyl)-3-hydroxy-2,6-dimethylphenyl]methyl]-1,3,5-triazine-2,4,6(1H,3H,5H)-trione; 4,4'-methylenebis[2,6-dimethylphenol]; and mixtures thereof.

Preferably, the hindered phenol antioxidant comprises at least one phenolic —OH group having at least one C3-C6 branched alkyl at a position ortho to said at least one phenolic —OH group. More preferably, the hindered phenol antioxidant is an ester of 3,5-bis(1,1-dimethylethyl)-4-hydroxy-benzenepropanoic acid, and most preferably a C1-C22 linear alkyl ester of 3,5-bis(1,1-dimethylethyl)-4-hydroxy-benzenepropanoic acid. Commercially available C1-C22 linear alkyl esters of 3,5-bis(1,1-dimethylethyl)-4-hydroxy-benzenepropanoic acid include RALOX® from Raschig USA (Texas, USA), which is a methyl ester of 3,5-bis(1,1-dimethylethyl)-4-hydroxy-benzenepropanoic acid, and TINOGARD® TS from BASF (Ludwigshafen, Germany), which is an octadecyl ester of 3,5-bis(1,1-dimethylethyl)-4-hydroxy-benzenepropanoic acid.

Furthermore, the anti-oxidant used in the composition may be selected from the group consisting of α-, β-, γ-, δ-tocopherol, ethoxyquin, 2,2,4-trimethyl-1,2-dihydroquinoline, 2,6-di-tert-butyl hydroquinone, tert-butyl hydroxyanisole, lignosulphonic acid and salts thereof, and mixtures thereof. It is noted that ethoxyquin (1,2-dihydro-6-ethoxy-2,2,4-trimethylquinoline) is marketed under the name Raluquin™ by the company Raschig™.

Other types of anti-oxidants that may be used in the composition are 6-hydroxy-2,5,7,8-tetramethylchroman-2-carboxylic acid (Trolox™) and 1,2-benzisothiazoline-3-one (Proxel GXL™).

A further class of anti-oxidants which may be suitable for use in the composition is a benzofuran or benzopyran derivative having the formula:

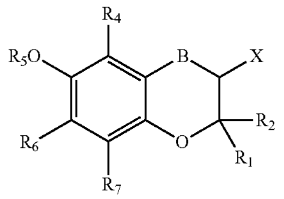

wherein $R_1$ and $R_2$ are each independently alkyl or $R_1$ and $R_2$ can be taken together to form a $C_5$-$C_6$ cyclic hydrocarbyl moiety; B is absent or $CH_2$; $R_4$ is $C_1$-$C_6$ alkyl; $R_5$ is hydrogen or —C(O)$R_3$ wherein $R_3$ is hydrogen or $C_1$-$C_{19}$ alkyl; $R_6$ is $C_1$-$C_6$ alkyl; $R_7$ is hydrogen or $C_1$-$C_6$ alkyl; X is —$CH_2$ OH, or —$CH_2$ A wherein A is a nitrogen comprising unit, phenyl, or substituted phenyl. Preferred nitrogen comprising A units include amino, pyrrolidino, piperidino, morpholino, piperazino, and mixtures thereof.). The cleaning compositions of the present disclosure may comprise tannins selected from the group consisting of gallotannins, ellagitannins, complex tannins, condensed tannins, and combinations thereof.

Hygiene Agent:

The compositions of the present invention may also comprise components to deliver hygiene and/or malodor benefits such as one or more of zinc ricinoleate, thymol, quaternary ammonium salts such as Bardac®, polyethylenimines (such as Lupasol® from BASF) and zinc complexes thereof, silver and silver compounds, especially those designed to slowly release Ag+ or nano-silver dispersions.

The cleaning compositions of the present invention may also contain antimicrobial agents. Cationic active ingredients may include but are not limited to n-alkyl dimethyl benzyl ammonium chloride, alkyl dimethyl ethyl benzyl ammonium chloride, dialkyl dimethyl quaternary ammonium compounds such as didecyl dimethyl ammonium chloride, N,N-didecyl-N-methyl-poly(oxyethyl) ammonium propionate, dioctyl didecyl ammonium chloride, also including quaternary species such as benzethonium chloride, alkyl pyridinium chlorides, and quaternary ammonium compounds with inorganic or organic counter ions such as bromine, carbonate or other moieties including dialkyl dimethyl ammonium carbonates, as well as antimicrobial amines such as Chlorhexidine Gluconate, PHMB (Polyhexamethylene biguanide), salt of a biguanide, a substituted biguanide derivative, an organic salt of a quaternary ammonium containing compound or an inorganic salt of a quaternary ammonium containing compound or mixtures thereof. More Preferably, the anti-microbial agent is selected from the group consisting of 4-4'-dichloro-2-hydroxy diphenyl ether ("Diclosan"), 2,4,4'-trichloro-2'-hydroxy diphenyl ether ("Triclosan"), and a combination thereof. Most preferably, the anti-microbial agent is 4-4'-dichloro-2-hydroxy diphenyl ether, commercially available from BASF, under the trademark name Tinosan®HP100.

Packaging.

Any conventional packaging may be used, and the packaging may be fully or partially transparent so that the consumer can see the color of the laundry care composition which may be provided or contributed to by the color of the dyes essential to the invention. UV absorbing compounds may be included in some or all of the packaging.

When in the form of a liquid, the laundry care compositions of the invention may be aqueous (typically above 2 wt % or even above 5 or 10 wt % total water, up to 90 or up to 80wt % or 70 wt % total water) or non-aqueous (typically below 2 wt % total water content). Typically the compositions of the invention will be in the form of an aqueous solution or uniform dispersion or suspension of surfactant, shading dye, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable. When in the form of a liquid, the laundry care compositions of the invention preferably have viscosity from 1 to 1500 centipoises (1-1500 mPa*s), more preferably from 100 to 1000 centipoises (100-1000 mPa*s), and most preferably from 200 to 500 centipoises (200-500 mPa*s) at 20s-1 and 21° C. Viscosity can be determined by conventional methods. Viscosity may be measured using an $AR_{550}$ rheometer from TA instruments using a plate steel spindle at 40 mm diameter and a gap size of 500 μm. The high shear viscosity at 20s-1 and low shear viscosity at 0.05-1 can be obtained from a logarithmic shear rate sweep from 0.1-1 to 25-1 in 3 minutes time at 21° C. The preferred rheology described therein may be achieved using internal existing structuring with detergent ingredients or by employing an external rheology modifier. More preferably the laundry care compositions, such as detergent liquid compositions have a high shear rate viscosity of from about 100 centipoise to 1500 centipoise, more preferably from 100 to 1000 cps. Unit Dose laundry care compositions, such as detergent liquid compositions have high shear rate viscosity of from 400 to 1000 cps. Laundry care compositions such as laundry softening compositions typically have high shear rate viscosity of from 10 to 1000, more preferably from 10 to 800 cps, most preferably from 10 to 500 cps. Hand dishwashing compositions have high shear rate viscosity of from 300 to 4000 cps, more preferably 300 to 1000 cps.

The liquid compositions, preferably the laundry care composition herein can be prepared by combining the components thereof in any convenient order and by mixing, e.g., agitating, the resulting component combination to form a phase stable liquid laundry care composition. In a process for preparing such compositions, a liquid matrix is formed containing at least a major proportion, or even substantially all, of the liquid components, e.g., non-ionic surfactant, the non-surface-active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

Pouches.

In a preferred embodiment of the invention, the composition is provided in the form of a unitized dose, either tablet form or preferably in the form of a liquid/solid (optionally granules)/gel/paste held within a water-soluble film in what is known as a pouch or pod. The composition can be encapsulated in a single or multi-compartment pouch. Multi-compartment pouches are described in more detail in EP-A-2133410. When the composition is present in a multi-compartment pouch, the composition of the invention may be in one or two or more compartments, thus the dye may be present in one or more compartments, optionally all compartments. Non-shading dyes or pigments or other aesthetics may also be used in one or more compartments. In one embodiment the composition is present in a single compartment of a multi-compartment pouch.

Preferred film materials are polymeric materials. The film material can be obtained, for example, by casting, blow-molding, extrusion or blown extrusion of the polymeric material, as known in the art. Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000. Mixtures of polymers can also be used as the pouch material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000. Also, suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol. Preferred for use herein are polymers which are from about 60% to about 98% hydrolyzed, preferably about 80% to about 90% hydrolyzed, to improve the dissolution characteristics of the material.

Naturally, different film material and/or films of different thickness may be employed in making the compartments of the present invention. A benefit in selecting different films is that the resulting compartments may exhibit different solubility or release characteristics.

Most preferred film materials are PVA films known under the MonoSol trade reference M8630, M8900, H8779 and those described in U.S. Pat. Nos. 6,166,117 and 6,787,512 and PVA films of corresponding solubility and deformability characteristics.

The film material herein can also comprise one or more additive ingredients. For example, it can be beneficial to add plasticizers, for example glycerol, ethylene glycol, diethyleneglycol, propylene glycol, sorbitol and mixtures thereof. Other additives include functional detergent additives to be delivered to the wash water, for example organic polymeric dispersants, etc.

Fibrous Water-Soluble Unit Dose Article:

As used herein, the phrases "water-soluble unit dose article," "water-soluble fibrous structure", and "water-soluble fibrous element" mean that the unit dose article, fibrous structure, and fibrous element are miscible in water. In other words, the unit dose article, fibrous structure, or fibrous element is capable of forming a homogeneous solution with water at ambient conditions. "Ambient conditions" as used herein means 23° C.±1.0° C. and a relative humidity of 50%±2%. The water-soluble unit dose article may contain insoluble materials, which are dispersible in aqueous wash conditions to a suspension mean particle size that is less than about 20 microns, or less than about 50 microns.

The fibrous water-soluble unit dose article may include any of the disclosures found in U.S. Patent Application Publication No. 2018/0216052 A1 filed on Jan. 26, 2018; U.S. Patent Application Publication No. 2018/026050 A1 filed Jan. 26, 2018; and U.S. Patent Application Publication No. 2018/0216053 A1 filed Jan. 26, 2018; incorporated by reference in their entirety. Preferred water-soluble fibrous structure comprises particles having a ratio of Linear Alkylbenzene Sulfonate to Alkylethoxylated Sulfate or Alkyl Sulfate of greater than 1.

These fibrous water-soluble unit dose articles can be dissolved under various wash conditions, e.g., low temperature, low water and/or short wash cycles or cycles where consumers have been overloading the machine, especially with items having high water absorption capacities, while providing sufficient delivery of active agents for the intended effect on the target consumer substrates (with similar performance as today's liquid products). Furthermore, the water-soluble unit dose articles described herein can be produced in an economical manner by spinning fibers comprising active agents. The water-soluble unit dose articles described herein also have improved cleaning performance.

Method of Use. The compositions of this invention, prepared as hereinbefore described, can be used to form aqueous washing/treatment solutions for use in the laundering/treatment of fabrics. Generally, an effective amount of such compositions is added to water, for example in a conventional fabric automatic washing machine, to form such aqueous laundering solutions. The aqueous washing solution so formed is then contacted, typically under agitation, with the fabrics to be laundered/treated therewith. An effective amount of the liquid detergent compositions herein added to water to form aqueous laundering solutions can comprise amounts sufficient to form from about 500 to 7,000 ppm of composition in aqueous washing solution, or from about 1,000 to 3,000 ppm of the laundry care compositions herein will be provided in aqueous washing solution.

Typically, the wash liquor is formed by contacting the laundry care composition with wash water in such an amount so that the concentration of the laundry care composition in the wash liquor is from above 0 g/l to 5 g/l, or from 1 g/l, and to 4.5 g/l, or to 4.0 g/l, or to 3.5 g/l, or to 3.0 g/l, or to 2.5 g/l, or even to 2.0 g/l, or even to 1.5 g/l. The method of laundering fabric or textile may be carried out in a top-loading or front-loading automatic washing machine or can be used in a hand-wash laundry application. In these applications, the wash liquor formed and concentration of laundry detergent composition in the wash liquor is that of the main wash cycle. Any input of water during any optional rinsing step(s) is not included when determining the volume of the wash liquor.

The wash liquor may comprise 40 liters or less of water, or 30 liters or less, or 20 liters or less, or 10 liters or less, or 8 liters or less, or even 6 liters or less of water. The wash liquor may comprise from above 0 to 15 liters, or from 2 liters, and to 12 liters, or even to 8 liters of water. Typically, from 0.01 kg to 2 kg of fabric per liter of wash liquor is dosed into said wash liquor. Typically, from 0.01 kg, or from 0.05 kg, or from 0.07 kg, or from 0.10 kg, or from 0.15 kg, or from 0.20 kg, or from 0.25 kg fabric per liter of wash liquor is dosed into said wash liquor. Optionally, 50 g or less, or 45 g or less, or 40 g or less, or 3 g or less, or 30 g or less, or 25 g or less, or 20 g or less, or even 15 g or less, or even 10 g or less of the composition is contacted to water to form the wash liquor. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Typically the wash liquor comprising the laundry care composition of the invention has a pH of from 3 to 11.5.

In one aspect, such method comprises the steps of optionally washing and/or rinsing said surface or fabric, contacting said surface or fabric with any composition disclosed in this specification then optionally washing and/or rinsing said surface or fabric is disclosed, with an optional drying step.

Drying of such surfaces or fabrics may be accomplished by any one of the common means employed either in domestic or industrial settings. The fabric may comprise any fabric capable of being laundered in normal consumer or institutional use conditions, and the invention is suitable for cellulosic substrates and in some aspects also suitable for synthetic textiles such as polyester and nylon and for treatment of mixed fabrics and/or fibers comprising synthetic and cellulosic fabrics and/or fibers. As examples of synthetic fabrics are polyester, nylon, these may be present in mixtures with cellulosic fibers, for example, polycotton fabrics. The solution typically has a pH of from 7 to 11, more usually 8 to 10.5. The compositions are typically employed at concentrations from 500 ppm to 5,000 ppm in solution. The water temperatures typically range from about 5° C. to about 90° C. The water to fabric ratio is typically from about 1:1 to about 30:1.

Another method includes contacting a nonwoven substrate, which is impregnated with the detergent composition, with a soiled material. As used herein, "nonwoven substrate" can comprise any conventionally fashioned nonwoven sheet or web having suitable basis weight, caliper (thickness), absorbency, and strength characteristics. Non-limiting examples of suitable commercially available nonwoven substrates include those marketed under the trade names SONTARA® by DuPont and POLY WEB® by James River Corp.

Unit Dose Detergent:

In some embodiments the laundry detergent composition is enclosed in a water-soluble film material, such as a polyvinyl alcohol, to form a unit dose pouch. In some embodiments, the unit dose pouch comprises a single or multi-compartment pouch where the liquid laundry detergent composition can be used in conjunction with any other conventional powder or liquid detergent composition. Examples of suitable pouches and water-soluble film materials are provided in U.S. Pat. Nos. 6,881,713, 6,815,410, and 7,125,828.

Method of Treating Fabrics/Textiles and Uses of Detergent Compositions:

The detergent compositions herein may be used to treat a textile garment, such as clothing or other household textiles (sheets, towels, and the like). Also contemplated herein is a method of treating a substrate by contacting a substrate with the detergent composition disclosed herein. As used herein, "detergent compositions" include fabric treatment compositions and liquid laundry detergent compositions for hand-wash, machine wash and other purposes including fabric care additive compositions and compositions suitable for use in the soaking and/or pre-treatment of stained fabrics.

COMPARATIVE EXAMPLES

TABLE 1

| | | 'Best in Class' Commercial Composition | 'Best in Class' nil-AES Commercial Composition | Economical Commercial Composition | Inventive Composition |
|---|---|---|---|---|---|
| wt% Active | C25 EO2.5 S | 6.0% | 0.0% | 6.6% | 0.0% |
| | C12/14 AS | 0.0% | 13.4% | 0.0% | 0.0% |
| | C11.8 LAS | 10.1% | 0.0% | 1.6% | 7.5% |
| | NI C25 EO9 | 6.9% | 7.3% | 0.0% | 13.4% |
| | C12/14 AO | 0.0% | 2.3% | 0.0% | 2.1% |
| | Ethoxylated propoxylated polyethyleneimine | 1.1% | 1.9% | 0.0% | 1.2% |

TABLE 1-continued

| | | 'Best in Class' Commercial Composition | 'Best in Class' nil-AES Commercial Composition | Economical Commercial Composition | Inventive Composition |
|---|---|---|---|---|---|
| | Ethoxylated polyethyleneimine | 1.7% | 1.7% | 0.0% | 2.8% |
| | C12/18 Fatty Acid | 0.3% | 3.6% | 0.0% | 4.2% |
| | Silicone Suds Suppressor | 0.2% | 0.0% | 0.0% | 0.0% |
| Fatty Acid to Amine Oxide (FA:AO) Ratio | | N/A | 1.6 | N/A | 2.0 |
| Grease Data (SRI) | Burnt Butter Stain | 46.3 | 40.5 | 35.4 | 44.0 |
| | Cooked Beef Stain | 28.2 | 28.9 | 23.3 | 27.9 |
| Suds Data | Water | 9.8 gal | 12.1 gal | 10.1 gal | 9.4 gal |
| | Cycle Time | 68 mins | 87 mins | 70 mins | 69 mins |

As shown in Table 1, it has been surprisingly found that one can achieve comparable cleaning, cycle time, and water usage to a 'best in class', AES-containing detergent formulation while reducing the number of components in the formulation such as, for example, suds suppressor. Further, as shown above in Table 1, the inventive composition exhibits better cleaning than an economical formulation. Last, as will be shown in the following tables 2-5, it has been surprisingly found that by having a fatty acid to amine oxide ratio of between about 2 to 4, one can control sudsing in a manner that reduces water usage levels and cycle time. This is shown when comparing the Inventive Composition, which has a FA:AO ratio of 2.0 to the 'best in class' nil-AES composition which has a FA:AO ratio of 1.6. The Tier 1 formulation with a ratio of 1.6 utilizes almost 3 more gallons of water, or about 30% more water and increases cycle time by almost 25%.

Tables 1-5 utilize burnt butter stain and cooked beef stain. Burnt butter stain and cooked beef stain are hydrophilic grease stains recognized as difficult to remove from textiles. These are used as technical benchmarks to identify 'best in class' detergents that have the strongest technical performance on removing grease stains. In addition, consumer acceptance of a laundry detergent's performance correlates with how well it performs on hydrophilic grease stain removal.

TABLE 2

| | | Comparative C | Comparative E | Comparative F | Comparative I | Inventive Composition | Comparative G |
|---|---|---|---|---|---|---|---|
| wt % Active | C25 EO2.5 S | 0.0% | 0.0% | 0.0% | 0.0% | 0.0% | 0.0% |
| | C12/14 AS | 0.0% | 0.0% | 0.0% | 0.0% | 0.0% | 0.0% |
| | C11.8 LAS | 7.5% | 7.5% | 7.5% | 7.5% | 7.5% | 7.5% |
| | NI C25 EO9 | 13.4% | 13.4% | 13.4% | 13.4% | 13.4% | 13.4% |
| | C12/14 AO | 2.1% | 2.1% | 2.1% | 2.1% | 2.1% | 2.1% |
| | Ethoxylated propoxylated polyethyleneimine | 1.2% | 1.2% | 1.2% | 1.2% | 1.2% | 1.2% |
| | Ethoxylated polyethyleneimine | 2.8% | 2.8% | 2.8% | 2.8% | 2.8% | 2.8% |
| | C12/18 Fatty Acid | 0.5% | 1.1% | 2.1% | 3.2% | 4.2% | 8.4% |
| | Silicone Suds Suppressor | 0.0% | 0.0% | 0.0% | 0.0% | 0.0% | 0.0% |
| FA:AO Ratio | | 0.25 | 0.50 | 1.0 | 1.5 | 2.0 | 4.0 |
| Grease Data (SRI) | Burnt Butter Stain | 45.8 | 45.5 | 45.0 | 44.4 | 44.0 | 41.7 |
| | Cooked Beef Stain | 29.7 | 29.4 | 28.9 | 28.4 | 27.9 | 25.8 |
| Suds Data | Water | 13.4 gal (Method Fail) | Suds Lock Machine Fail | Suds Lock Machine Fail | 12.0 gal | 9.4 gal | 9.0 gal |
| | Cycle Time | 151 mins (Method Fail) | | | 191 mins (Method Fail) | 69 mins | 67 mins |

As shown in Table 2, it has been surprisingly found that one can create a formulation that does not contain silicone suds suppressors and that exhibits 'best in class' comparable cleaning, cycle time, and water usage by controlling the FA:AO ratio. As shown in Table 2, which keeps the Amine Oxide level constant at 2.1% active, at ratios of 1.5 and below, the machine enters suds lock or fails the test method described below and must significantly increase the cycle time and/or the amount of water needed to complete the cycle. Without being bound by theory, it is believed that the increase in cycle time is due to the suds sensor in the machine. Essentially, the machine waits for the suds to dissipate and/or will further dilute the formulation to reduce the suds level in the machine. As shown in Table 2, at a ratio of 1.5 or less, either the machine fails or the cycle time is 2 times, to over 2.5 times the cycle time at ratios from about 2 to 4. To a consumer, this means that by using a formulation that has a FA:AO ratio of 2, they can run two loads or more in the time it takes to run a load using a formulation that has a FA:AO ratio of 1.5.

Further, as shown below in Table 3, it has been surprisingly found that the ratio relationship holds regardless of the level of Amine Oxide used in the formulation.

TABLE 3

| | | Comparative B | Comparative D | Comparative J |
|---|---|---|---|---|
| % | C25 EO2.5 S | 0.0% | 0.0% | 0.0% |
| Active | C12/14 AS | 0.0% | 0.0% | 0.0% |
| | C11.8 LAS | 7.5% | 7.5% | 7.5% |
| | NI C25 EO9 | 11.3% | 11.3% | 11.3% |
| | C12/14 AO | 4.2% | 4.2% | 4.2% |
| | Ethoxylated propoxylated polyethyleneimine | 1.2% | 1.2% | 1.2% |
| | Ethoxylated polyethyleneimine | 2.8% | 2.8% | 2.8% |
| | C12/18 Fatty Acid | 1.1% | 2.1% | 8.4% |
| | Silicone Suds Suppressor | 0.0% | 0.0% | 0.0% |
| | FA:AO Ratio | 0.25 | 0.50 | 2.0 |
| Grease | Burnt Butter Stain | 50.6 | 50.0 | 46.9 |
| Data (SRI) | Cooked Beef Stain | 33.4 | 32.9 | 30.0 |
| Suds | Water | Suds Lock | Suds Lock | 9.6 gal |
| Data | Cycle Time | Machine Fail | Machine Fail | 66 mins |

Table 3 above utilizes double the active level of Amine Oxide (4.2%) as is demonstrated in Table 2 (2.1%), however, as shown above, the same effect is found wherein the FA:AO ratio drives water level and cycle time of the machine. As previously stated, it has been surprisingly found that having a FA:AO ratio of between about 2 and 4 or at least greater than about 2 is a key driver in controlling suds in the absence of known suds suppressors such as silicone suds suppressors.

TABLE 4

| | | Comparative H | Inventive Composition | Comparative J |
|---|---|---|---|---|
| wt% Active | C25 EO2.5 S | 0.0% | 0.0% | 0.0% |
| | C12/14 AS | 0.0% | 0.0% | 0.0% |
| | C11.8 LAS | 7.5% | 7.5% | 7.5% |
| | NI C25 EO9 | 15.5% | 13.4% | 11.3% |
| | C12/14 AO | 0.0% | 2.1% | 4.2% |
| | Ethoxylated propoxylated polyethyleneimine | 1.2% | 1.2% | 1.2% |
| | Ethoxylated polyethyleneimine | 2.8% | 2.8% | 2.8% |
| | C12/18 Fatty Acid | 4.2% | 4.2% | 8.4% |
| | Silicone Suds Suppressor | 0.0% | 0.0% | 0.0% |
| | FA:AO Ratio | N/A | 2.0 | 2.0 |
| Grease Data (SRI) | Burnt Butter Stain | 38.8 | 44.0 | 46.9 |
| | Cooked Beef Stain | 23.8 | 27.9 | 30.0 |
| Suds Data | Water | 9.9 gal | 9.4 gal | 9.6 gal |
| | Cycle Time | 68 mins | 69 mins | 66 mins |

As shown in Table 4, it has further been surprisingly found that the level of Amine Oxide and cleaning efficacy does not exhibit a linear relationship. Instead, as one doubles the level of Amine Oxide from 2.1% to 4.2%, there is no statistically significant increase in cleaning efficacy as shown by the SRI data for Burnt Butter and Cooked Beef. This is in contrast between the over 10% increase in SRI scores when moving from 0% Amine Oxide to 2.1% Amine Oxide. As such, there is a diminishing return in the use of higher Amine Oxide levels.

TABLE 5a

| | Inventive Composition | A | C | B | E | D | C |
|---|---|---|---|---|---|---|---|
| AO (wt %) | 2.1% | 4.2% | 2.1% | 4.2% | 2.1% | 4.2% | 2.1% |
| FA (wt %) | 4.2% | 0.0 | 0.5% | 1.1% | 1.1% | 2.1% | 2.1% |
| FA:AO Ratio | 2.0 | 0.0 | 0.25 | 0.25 | 0.50 | 0.50 | 1.0 |
| Burnt Butter | 44.0 | 51.0 | 45.8 | 50.6 | 45.5 | 50.0 | 45.0 |
| Cooked Beef | 27.9 | 34.0 | 29.7 | 33.4 | 29.4 | 32.9 | 28.9 |
| Water | 9.4 gal | Suds Lock Machine | 13.4 gal | Suds Lock Machine | Suds Lock Machine | Suds Lock Machine | Suds Lock Machine |
| Cycle Time | 69 mins | Fail | 151 mins | Fail | Fail | Fail | Fail |

TABLE 5b

| | Inventive Composition | I | H | G | J |
|---|---|---|---|---|---|
| AO (wt%) | 2.1% | 2.1% | 0.0% | 2.1% | 4.2% |
| FA (wt%) | 4.2% | 3.2% | 4.2% | 8.4% | 8.4% |
| FA:AO Ratio | 2.0 | 1.5 | N/A | 4.0 | 2.0 |
| Burnt Butter | 44.0 | 44.4 | 38.8 | 41.7 | 46.9 |
| Cooked Beef | 27.9 | 28.4 | 23.8 | 25.8 | 30.0 |
| Water | 9.4 gal | 12.0 gal | 9.9 gal | 9.0 gal | 9.6 gal |
| Cycle Time | 69 mins | 191 mins | 68 mins | 67 mins | 66 mins |

As shown above in Table 5a-5b, it has further been found that there is an optimal level of Fatty Acid of greater than 3%, such as, for example between 3% and 10%, between 3.5% and 8.5%, or between 4% and 6%. This level is required to maintain the previously discussed FA:AO ratio of about 2 or greater. As shown above in Table 5a, Fatty Acid levels of less than 3% result in suds locks or machine failures or significantly extended cycle times and additional wash water. As shown in Table 5b, Fatty Acid levels above 3% result in successful cycle times and wash water usage. It is noted that composition I which is at 3.2% Fatty Acid failed the method test for cycle time but passed for water usage whereas all samples under 3% Fatty Acid either had a suds lock or failed for both cycle time and water usage rendering them consumer undesirable for both measures. Further, as shown above, the addition of Fatty Acid without Amine Oxide (Comparative example 'H') leads to a loss of cleaning efficacy when compared to formulating Amine Oxide at a level of at least 1.5%.

Test Methods:

Suds Data/Method Details:

High Efficiency (HE) washing machines use less water for washing and rinsing than traditional washing machines. With less water, detergents without proper suds control can cause HE washing machines to add additional cycle time (cycle extension), extra water (additional rinses), or completely shut off, termed a 'suds lock', as a way prevent excessive suds from causing damage to the washer, or leftover suds residue at the end of the cycle. The addition of either excessive cycle times (greater than 90 minutes) and/or additional wash water (greater than 12 gallons) is considered a 'method fail', as described below.

To evaluate a detergent's sudsing risk in HE washing machines, a General Electric GFWS1700 front loading washing machine was used as a consumer relevant HE washing machine with a dynamic suds response, where a combination of cycle time, rinses, and suds lock was used as a response to excessive suds. There are a range of suds responses across washing machine manufacturers due to differences in suds response algorithms in machine programming. This machine was chosen as consumer relevant based on its ability to be reactive and discriminating (dynamic range of water and cycle time) towards sudsing risk of different laundry detergents. Some HE washing machines do not cause a suds response and leave the consumer with suds residue at the end of the cycle, while others are over-reactive, adding water and cycle time even when using detergents with proper suds control.

Using this washing machine, cycle time, water volume, and suds lock (machine fail) were recorded when testing detergents and compared versus baseline control of a cycle performed without any detergent. Colors/Normal cycle (70° F. wash/60° F. rinse), soft water (0 grains per gallon), and a load size of 8-8.5 pounds of polycotton textile ballast was used across all suds testing cycles. Under these conditions, 9-12 gallons of total water, and less than 90 minutes of total cycle time were considered 'passing' testing results, as seen when the cycle was performed without any detergent or with a detergent with proper suds control. Any values outside of these are considered a washing machine response to excessive suds caused by a detergent without proper suds control, including and up to a suds lock (machine fail), where the machine stops running to prevent damage to the washing machine.

Stain Removal Method:

Technical stain swatches of CW120 cotton containing Burnt Butter Stain and Cooked Beef Stain were purchased from Accurate Product Development Co., Inc (Cincinnati, OH). The swatches were washed in a Whirlpool® front loader High Efficiency washing machine (standard 19 liter wash cycle), using 7 grains per gallon water hardness and washed at 77 degrees Fahrenheit. The total amount of liquid detergent used in the tests was 45 grams.

Image analysis was used to compare each stain to an unstained fabric control. Software converted images taken into standard colorimetric values and compared these to standards based on the commonly used Macbeth Color Rendition Chart, assigning each stain a colorimetric value (Stain Level). Eight replicates of each stain were prepared. Stain removal from the swatches was measured as follows:

$$\text{Stain Removal Index } (SRI) = \frac{\Delta E_{initial} - \Delta E_{washed}}{\Delta E_{initial}} \times 100$$

$\Delta E_{initial}$=Stain level before washing $\Delta E_{washed}$=Stain level after washing The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid detergent composition comprising:

a) from about 10% to about 60%, by weight of the composition, of a surfactant system wherein said surfactant system comprises:

i) at least 35%, by weight of the surfactant system, of nonionic surfactant;

ii) from 5% to about 20%, by weight of the surfactant system, of amine oxide;

b) fatty acid; and c) from about 35% to about 80%, by weight of the composition, of water;

wherein the surfactant system does not comprise alkyl ethoxy sulfate surfactants; wherein the composition does not comprise a silicone suds suppressor; and the fatty acid to amine oxide weight ratio is from 2 to 4.

2. The liquid detergent composition of claim 1, wherein from about 0.1% to about 100% of the carbon content of the nonionic surfactant, the amine oxide, or combinations thereof are derived from renewable sources.

3. The liquid detergent composition of claim 1, wherein the surfactant system further comprises an additional surfactant selected from anionic surfactants, cationic surfactants, zwitterionic surfactants, and mixtures thereof.

4. The liquid detergent composition of claim 1 wherein the composition comprises from about 15% to about 50%, by weight of the composition, of the surfactant system.

5. The liquid detergent composition of claim 1, wherein the composition comprises from about 15% to about 35%, by weight of the composition, of the surfactant system.

6. The liquid detergent composition of claim 1, wherein the composition further comprises from about 0.1% to about 10.0%, by weight of the composition, of a laundry adjunct selected from enzymes, enzymes stabilizers, optical brighteners, hydrotropes, perfume, soil suspending polymers and/or soil release polymers, fabric care benefits, pH adjusting agents, dye transfer inhibiting agents, preservatives, hueing dyes, nonfabric substantive dyes, encapsulated actives, and mixtures thereof.

7. The liquid detergent composition of claim 1, wherein the composition further comprises perfume microcapsules.

8. The liquid detergent composition of claim 1, wherein the composition further comprises a hueing dye.

9. The liquid detergent composition of claim 1, further comprising an anionic surfactant comprising a first anionic surfactant, wherein said first anionic surfactant consists essentially of a mixture of surfactant isomers of Formula I and surfactants of Formula II:

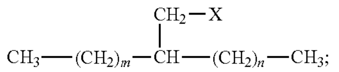

(I)

$6 \le m \le 11$ $$CH_3-(CH_2)_{m+n+3}-X; \quad (II)$$

$0 \le n \le 5$ wherein from about 50% to about 100% by weight of the first anionic surfactant are isomers having m+n=11; wherein from about 25% to about 50% of the mixture of surfactant isomers of Formula I have n=0; wherein from about 0.001% to about 25% by weight of the first surfactant are surfactants of Formula II; and wherein X is a hydrophilic moiety.

10. The liquid detergent composition of claim 1, further comprising an anionic surfactant comprising an alkyl benzene sulfonate.

* * * * *